(12) United States Patent
Harder et al.

(10) Patent No.: US 10,380,491 B2
(45) Date of Patent: Aug. 13, 2019

(54) SYSTEM FOR PREDICTING THE RECURRENCE OF CANCER IN A CANCER PATIENT

(71) Applicant: Definiens AG, Munich (DE)

(72) Inventors: Nathalie Harder, Munich (DE); Maria Athelogou, Munich (DE)

(73) Assignee: Definiens AG, Munich (DE)

( * ) Notice: Subject to any disclaimer, the term of this patent is extended or adjusted under 35 U.S.C. 154(b) by 738 days.

(21) Appl. No.: 15/075,180

(22) Filed: Mar. 20, 2016

(65) Prior Publication Data

US 2017/0270420 A1    Sep. 21, 2017

(51) Int. Cl.
*G06T 7/00* (2017.01)
*G06N 7/00* (2006.01)
(Continued)

(52) U.S. Cl.
CPC ........... *G06N 7/005* (2013.01); *G06K 9/4652* (2013.01); *G06K 9/52* (2013.01); *G06K 9/6267* (2013.01);
(Continued)

(58) Field of Classification Search
CPC ....... G06T 7/0012; G06T 7/0014; G06T 7/11; G06T 7/12; G06T 7/155; G06T 7/174; G06T 2207/30024; G06T 2207/30081; G06T 2207/30096; G06K 9/00127; G06K 9/0014; G06K 9/00147; G01N 2015/1006; A61B 5/4381; A61B 5/4842; A61B 5/4848
See application file for complete search history.

(56) References Cited

U.S. PATENT DOCUMENTS

| | | | |
|---|---|---|---|
| 8,879,819 B2 | 11/2014 | Athelogou et al. | 382/133 |
| 2010/0184093 A1* | 7/2010 | Donovan et al. | G16H 50/50 435/7.21 |
| 2014/0169654 A1 | 6/2014 | Athelogou et al. | 382/133 |

OTHER PUBLICATIONS

M. Lanciotti et al., "The Role of M1 and M2 Macrophages in Prostate Cancer in relation to Extracapsular Tumor Extension and Biochemical Recurrence after Radical Prostatectomy," University of Florence, Italy, Mar. 11, 2014, vol. 2014, Article 486798 BioMed Research International XP055373551 http://dx.doi.org/10.1155/2014/486798 (6 pages).

(Continued)

*Primary Examiner* — Andrew W Johns
(74) *Attorney, Agent, or Firm* — Imperium Patent Works; Darien K. Wallace; T. Lester Wallace

(57) ABSTRACT

A system predicts the recurrence of cancer. A first slice of a prostate tissue sample is stained so that luminal epithelial cells and basal epithelial cells are stained different colors. A first digital image is taken of the first slice. The second slice of the sample is stained so that M1 type macrophages and M2 type macrophages are differentially stained. A second digital image is taken of the second slice. The system analyzes the first digital image and defines regions of non-intact glands. Intact gland regions are then determined, and regions of stroma are identified. The system defines influence zones between non-intact regions and stroma regions. Using information from the second image, macrophages in the tissue corresponding to the influence zones are identified and counted. Based at least in part on this count, the system determines a score. The score is indicative of whether the patient will experience PSA recurrence.

18 Claims, 24 Drawing Sheets

(51) Int. Cl.
  *G06K 9/46* (2006.01)
  *G06K 9/52* (2006.01)
  *G06K 9/62* (2006.01)
  *G06K 9/66* (2006.01)

(52) U.S. Cl.
  CPC .............. *G06K 9/66* (2013.01); *G06T 7/0012* (2013.01); *G06K 2009/4666* (2013.01); *G06T 2207/30004* (2013.01); *G06T 2207/30024* (2013.01); *G06T 2207/30081* (2013.01); *G06T 2207/30242* (2013.01)

(56) References Cited

OTHER PUBLICATIONS

Q. Zhang et al., "Interleukin-17 Promotes Development of Castration-Resistant Prostate Cancer Potentially Through Creating an Immunotolerant and Pro-Angiogenic Tumor Microenvironment," The Prostate 74:869-879 Tulane University School of Medicine, Apr. 1, 2014, wileyonlinelibrary.com XP055310525 (12 pages).

Soeda et al., "Tumor-associated macrophages correlate with vascular space invasion and myometrial invasion in endometrial carcinoma," Gynecologic Oncology 109 (2008) 122-128 Mar. 4, 2008 www.elsevier.com/locate/ygynoXP022575814 (8 pages).

Lin et al., "Clinical significance of tumor-associated macrophage infiltration in supraglottic laryngeal carcinoma," Chinese Journal of Cancer vol. 30 Issue 4 (2011), Chinese Anti-Cancer Association, Shanghai Jiaotong University www.cjcsysu.com XP055373824 (8 pages).

European Search Report dated May 26, 2017 in counterpart foreign application EP17159881.6 issued by the European Patent Office (15 pages).

Edin et al., "The Distribution of Macrophages with a M1 or M2 Phenotype in Relation to Prognosis and the Molecular Characteristics of Colorectal Cancer," Oct. 15, 2012, PLoS One. 2012; 7(10): e47045; doi:10.1371/journal.pone.0047045; PMCID: PMC3471949 (22 pages).

Harder et al., "Co-Occurrence Features Characterizing Gland Distribution Patterns as New Prognostic Markers in Prostate Cancer Whole-Slide Images," 2016 not yet published, IEEE Int'l Symposium on Biomedical Imaging (4 pages).

Kong et al., "The Clinical Significance of the CD163+ and CD68+ Macrophages in Patients with Hepatocellular Carcinoma," Mar. 29, 2013 PLoS One 8(3): e59771; doi:10.1371/journal.pone.0059771 (15 pages).

Lanciotti et al., "The Role of M1 and M2 Macrophages in Prostate Cancer in relation to Extracapsular Tumor Extension and Biochemical Recurrence after Radical Prostatectomy," Mar. 11, 2014, BioMed Research International, vol. 2014, Article ID 486798, http://dx.doi.org/10.1155/2014/486798 (6 pages).

Martinez et al., "The M1 and M2 paradigm of macrophage activation: time for reassessment," Mar. 3, 2014, F1000Prime Rep. 2014; 6:13; doi:10.12703/P6-13; PMCID: PMC3944738 (18 pages).

* cited by examiner

STARTING FIRST DIGITAL IMAGE

STARTING SECOND DIGITAL IMAGE

GENERATE NON-INTACT GLAND OBJECTS - EACH NON-INTACT GLAND OBJECT CORRESPONDS TO AN INDIVIDUAL NON-INTACT GLAND

GENERATE INTACT GLAND OBJECTS - EACH INTACT GLAND
OBJECT CORRESPONDS TO AN INDIVIDUAL NON-INTACT GLAND

AGGREGATE REGIONS THAT CORRESPOND TO THE NON-INTACT
GLAND OBJECTS THEREBY FORMING A NON-INTACT REGION MASK

TRANSFER THE NON-INTACT REGION
MASK ONTO THE SECOND IMAGE

SHRINKING OPERATION PERFORMED ON THE NON-INTACT REGION MASK - THIS RESULTS IN A LOSS OF SMALL NON-INTACT REGIONS

FIRST EXPANDING OPERATION PERFORMED
ON THE NON-INTACT REGION MASK

SECOND EXPANDING OPERATION PERFORMED ON THE NON-INTACT
REGION MASK - THIS RESULTS IN FILLING HOLES IN NON-INTACT REGIONS

SHRINKING OPERATION PERFORMED ON THE NON-INTACT REGION
MASK - THIS RESULTS IN THE FINAL NON-INTACT REGIONS

AGGREGATE REGIONS THAT CORRESPOND TO THE INTACT
GLAND OBJECTS THEREBY FORMING AN INTACT REGION MASK

TRANSFER THE INTACT REGION
MASK ONTO THE SECOND IMAGE

EXPANDING OPERATION PERFORMED
ON THE INTACT REGION MASK

SHRINKING OPERATION PERFORMED ON THE INTACT REGION
MASK - THIS RESULTS IN THE FINAL INTACT REGIONS

DEFINE THE STROMA REGIONS FROM
NON-INTACT REGIONS AND INTACT REGIONS

DEFINE INFLUENCE ZONES

GENERATE M1 (→) MACROPHAGE OBJECTS

GENERATE M2 (→) MACROPHAGE OBJECTS

COUNT M1 ( → ) MACROPHAGES IN INFLUENCE ZONES

COUNT M1 (→) MACROPHAGES IN STROMA REGIONS
COUNT M2 (⇢) MACROPHAGES IN STROMA REGIONS

COUNT M2 (→) MACROPHAGES IN NON-INTACT REGIONS

DISPLAY 12

SCORE 10

| ID# | V1 | V2 | V3 | C1 | C2 | C3 | C1+C2+C3 | PSA REC |
|---|---|---|---|---|---|---|---|---|
| 29 | 0.0482 | 0.0805 | 0.3111 | 0 | 0 | 1 | 1 | 0 |
| 30 | 0.0456 | 0.0911 | 0.2719 | 0 | 0 | 0 | 0 | 0 |
| 31 | 0.0440 | 0.1866 | 0.2926 | 0 | 0 | 1 | 1 | 0 |
| 32 | 0.0217 | 0.0913 | 0.2445 | 1 | 0 | 0 | 1 | 0 |
| 33 | 0.0345 | 0.0607 | 0.5257 | 0 | 1 | 1 | 2 | 1 |
| 34 | 0.0059 | 0.0269 | 0.3318 | 1 | 1 | 1 | 3 | 1 |
| 35 | 0.0027 | 0.0286 | 0.1862 | 1 | 1 | 0 | 2 | 1 |
| 35 | 0.0185 | 0.0202 | 0.5084 | 1 | 1 | 1 | 3 | 1 |

PSA REC OF "1" = PSA RECURRENCE IS PREDICTED
PSA REC OF "0" = PSA RECURRENCE IS NOT PREDICTED

COLUMN OF SCORES

DISPLAY THE SCORE ON THE DISPLAY DEVICE

FIG. 25

KNOWN PSA RECURRENCE
0 = THERE WAS NO PSA RECURRENCE
1 = THERE WAS PSA RECURRENCE

|  |  | 0 | 1 | SUM |
|---|---|---|---|---|
| SCORE AS OUTPUT BY THE SYSTEM 0 = PSA NON-RECURRENCE 1 = PSA RECURRENCE | 0 | 11 | 2 | 13 |
|  | 1 | 9 | 29 | 38 |
|  | SUM | 20 | 31 | 51 |

CONFUSION MATRIX FOR THE SYSTEM 1 OF FIG. 1

FIG. 26

KAPLAN-MEIER PLOT FOR THE SYSTEM 1 OF FIG. 1

KAPLAN-MEIER PLOT FOR GLEASON SCORING

SYSTEM FOR PREDICTING THE RECURRENCE OF CANCER IN A CANCER PATIENT

TECHNICAL FIELD

The present invention relates to systems and methods for detecting cancer and predicting the recurrence of cancer, and more particularly relates to systems and methods for predicting PSA recurrence.

BACKGROUND INFORMATION

Prostate cancer is one of the most commonly diagnosed cancers in men. Although prostate cancer can be detected with a blood test for high Prostate-Specific Antigen (PSA) levels, high PSA levels can also result from non-malignant growth of the prostate. A more accurate diagnosis of prostate cancer is obtained by analyzing a stained prostate biopsy using the Gleason grading system. The Gleason grading system was developed by Donald Gleason, a pathologist at the Veterans Administration, and correlates patterns in prostate biopsy specimens with tumor mortality rates.

The Gleason grading system evaluates the glandular architecture of the prostate tissue. Tissue is assigned a grade based on the overall pattern of the glands as well as the shapes of the individual glands. Malignant cells disrupt the regular pattern of the glands. Glands arranged in a disorganized, irregular pattern with only a small area of stroma between the glands are diagnosed as cancerous. In addition, tissue in which fewer of the individual glands are circular is also diagnosed as cancerous. Cancerous prostate tissue is classified into five grades 1 through 5 of decreasing regularity and circularity. The grades of the two patterns that cover the largest areas of the biopsy tissue are added to obtain the Gleason score.

The primary Gleason grade must be greater than fifty percent of the total pattern of the cancerous tissue. The secondary Gleason grade must be less than fifty percent, but at least five percent, of the pattern of the total cancer observed. If the secondary pattern covers less than five percent of the total area of observed cancer, the secondary grade is assigned the same grade as the primary grade. The sum of the primary and secondary Gleason grades is the Gleason score. For example, if the most prevalent pattern falls into grade 4 and the second most prevalent pattern falls into grade 3, then the Gleason score is 7.

Gleason grading is typically performed by a pathologist who visually evaluates a magnified image of a stained tissue sample. The pathologist manually inspects each cancerous area of a slide of stained tissue, classifies the patterns of the glands in each area based on the shape of the individual glands and the arrangement of neighboring glands to one another, and assigns a Gleason grade to each area of the tissue being graded. Then the pathologist determines an overall Gleason score for the tissue sample based on which Gleason grade was assigned to the largest area and to the second largest area of the tissue.

U.S. Pat. No. 8,879,819 explains that such manual grading of prostatic tissue is difficult and problematical. The pathologist must consistently evaluate a large number of cancerous areas on a highly magnified image of stained tissue. The pathologist should not miss any cancerous area. Moreover, the pathologist must consistently evaluate the gland arrangement and the shapes of individual glands in the various areas of a tissue slide as well as on other tissue slides in order to obtain an accurate Gleason score. U.S. Pat. No. 8,879,819 sets forth a system and method for obtaining an improved histopathological score. A first tissue slice is stained with a first stain that stains basal epithelial cells, and a first digital image is made of the first tissue slice. A second tissue slice is stained with a second stain that stains luminal epithelial cells, and a second digital image is made of the second tissue slice. The system and method of U.S. Pat. No. 8,879,819 analyzes the first and second digital images and generates a hierarchy of objects. From these objects, the system and method identifies intact glands and non-intact glands. The system and method then outputs the histopathological score which in one case is an improved Gleason score.

SUMMARY

In one novel aspect, a system outputs a score. The score is indicative of whether a cancer patient who has just undergone a radical prostatectomy will nonetheless likely suffer a recurrence of cancer. A tissue sample of the patient's prostate is taken. This sample may, for example, be obtained from the prostate tissue that was removed during the radical prostatectomy. The tissue sample is sliced into several very thin tissue slices. A first slice is duplex stained with a first pair of biomarkers, thereby obtaining a first stained tissue slice. In one example, the first stain of this duplex staining is a cytokeratin 18 (CK18) antibody stain that stains luminal epithelial cells of prostate glands a first color, and the second stain of the duplex staining is a transcription factor p63 antibody stain that stains basal epithelial cells of prostate glands a second color. A first high resolution color digital image is then taken of the first stained tissue slice.

A second slice that was adjacent to the first slice in the tissue sample is duplex stained with a second pair of biomarkers, thereby obtaining a second stained tissue slice. In one example, the first stain of this duplex staining is a CD68 stain, and the second stain of the duplex staining is a CD163 stain. Due to this double staining, individual M1 type macrophages are stained a first color, and individual M2 type macrophages are stained a second color. A second high resolution color digital image is then taken of the second stained tissue slice.

The first and second digital images are supplied to the system. The system analyzes the first digital image and generates non-intact gland objects. Each non-intact gland object corresponds to a non-intact gland in the first tissue slice. From the non-intact gland objects, the system defines regions of non-intact glands. The aggregation of the pixel areas of these non-intact regions is a non-intact region mask. The system also analyzes the first digital image and generates intact gland objects. Each intact gland object corresponds to an intact gland in the first tissue slice. The aggregation of the pixel areas of the intact regions is a non-intact region mask.

The system applies the non-intact region mask and the intact region mask to the second digital image thereby defining non-intact regions of the second digital image and intact regions of the second digital image. From these non-intact regions and intact regions, the system defines stroma regions. The aggregation of the pixel areas of all these stroma regions is a stroma region mask. From the non-intact region mask, the intact region mask, and the stroma region mask, the system defines influence zones in the second digital image. Each influence zone is a zone of pixels along a border of a non-intact region. In one particular example, the system will define an influence zone along a boundary between a non-intact region and a neighboring stroma region, but the system will not define any influence zone on the boundary between a non-intact region and a neighboring intact region. An influence zone mask is obtained. At this point in the process, the second digital image is divided into non-intact regions, intact regions, stroma regions, and influence zones.

The system analyzes the second digital image and generates macrophage objects. Each macrophage object corresponds to a macrophage in the second tissue slice. The system then counts the macrophage objects in at least one of the influence zones, thereby generating a count value. In one example, all the macrophage objects in all of the influences zones of the second tissue slice are counted together to generate one count value. In another example, only the M1 type macrophages in all the influence zones of the second tissue slice are counted. In another example, the number of M1 type macrophages in each influence zone is counted separately so that a different count is generated for each influence zone. These discrete counts are then used in some way to obtain a count indicative of a macrophage characteristic in the influence zones of the second tissue slice. Other counts of macrophages in influence zones can be made in other examples of the system, but at least one macrophage count value is generated, where that one count value is a count of some type or types of macrophages in one or more of the influence zones. Then, based at least in part on this macrophage count value, the system determines the score. As set forth above, the score is indicative of whether the patient will likely experience PSA recurrence. The score is displayed on a display of the system.

In one specific example of generating a score based at least in part on a macrophage count in an influence zone, the system counts the number of M1 type macrophages disposed in all the influence zones of the second digital image. This count is normalized, thereby generating a first value V1. The system also counts the number of M1 type macrophages in all of the stroma regions and influence zones, and counts the number of M2 type macrophages in all the stroma regions and influence zones. The ratio of the M1 count to the M2 count is a second value V2. The system also counts the number of M2 type macrophages in all the non-intact regions. This M2 count is divided by the aggregated total area of all the non-intact regions, thereby generating a third value V3. If the first value V1 is below a first threshold value TH1, then the system sets a first value C1 to one, otherwise the system sets the first value C1 to zero. If the second value V2 is below a second threshold value TH2, then the system sets a second value C2 to one, otherwise the system sets the second value C2 to zero. If the third value V3 is below a third threshold value TH3, then the system sets a third value C3 to zero, otherwise the system sets the third value C3 to one. The system then determines if the sum C1+C2+C3 is less than a fourth threshold value TH4. If the sum is determined to be less than the fourth threshold value TH4, then the system determines that the score is "PSA non-recurrence", otherwise the system determines that the score is "PSA recurrence". In this specific example, the score has only one of two possible values, either "PSA non-recurrence" or "PSA recurrence". In other examples, the score is one of more than two possible values. The score may, for example, be an indication of a value in a range of values, or an indication of a magnitude on a scale. The score as determined by the system is displayed on the display of the system.

A system that generates a score based at least in part on a macrophage count in an influence zone need not necessarily process two digital images, where each digital image was generated from a different tissue sample that was duplex stained. For example, a digital image can be taken of a tissue slice that was not duplex stained, and then the resulting digital image can be co-registered with one or more other digital images taken from other tissue slices of the tissue sample. The example of a system that receives and processes two and only digital images obtained from two different duplex stained tissue slices is described only as one non-limiting illustrative example.

In another novel aspect, a method involves a system for predicting a risk of cancer recurrence in a patient. A portion of a digital image is read into the system from a storage device. The digital image was acquired by a digital camera imaging a tissue section removed from the patient. The tissue section was immunohistochemically stained with a first stain that marked M1 macrophages with a first color thereby leaving first color information in the digital image. The tissue section was also immunohistochemically stained with a second stain that marked M2 macrophages with a second color thereby leaving second color information in the digital image. Geometric region information is then used by the system to identify a region in the digital image. In one example, the geometric information is generated by the system. The geometric information may, for example, be information that identifies a non-intact region mask. In another example, the geometric information is generated by a pathologist and the geometric information is then loaded into the system. The geometric information may, for example, be a marking of a visually determined cancerous region as determined visually by the pathologist. The system then detects first and second objects in the digital image. In one example, the first objects correspond to M1 macrophages and the second objects correspond to M2 macrophages. First objects that are in an influence zone around the region are counted, thereby generating a first object count. Second objects that are in the influence zone around the region are counted, thereby generating a second object count. In some examples the influence zone in which the counting is done is a single region and in other examples the influence zone is an aggregation of multiple regions. The influence zone or zones in which the macrophage counting occurs, however, is/are defined by the system. After the counting, the system computes a score using the first object count and the second object count. The score is indicative of cancer recurrence in the patient. The score is then stored in a storage device. The score is also displayed on a display such as on the screen of a display of a computer used by the pathologist.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 25 illustrates how the system displays the score on a display 12 of a computer of the system of FIG. 1.

FIG. 26 is a confusion matrix for the system of FIG. 1.

DETAILED DESCRIPTION

Reference will now be made in detail to some embodiments of the invention, examples of which are illustrated in the accompanying drawings.

Figure 1:
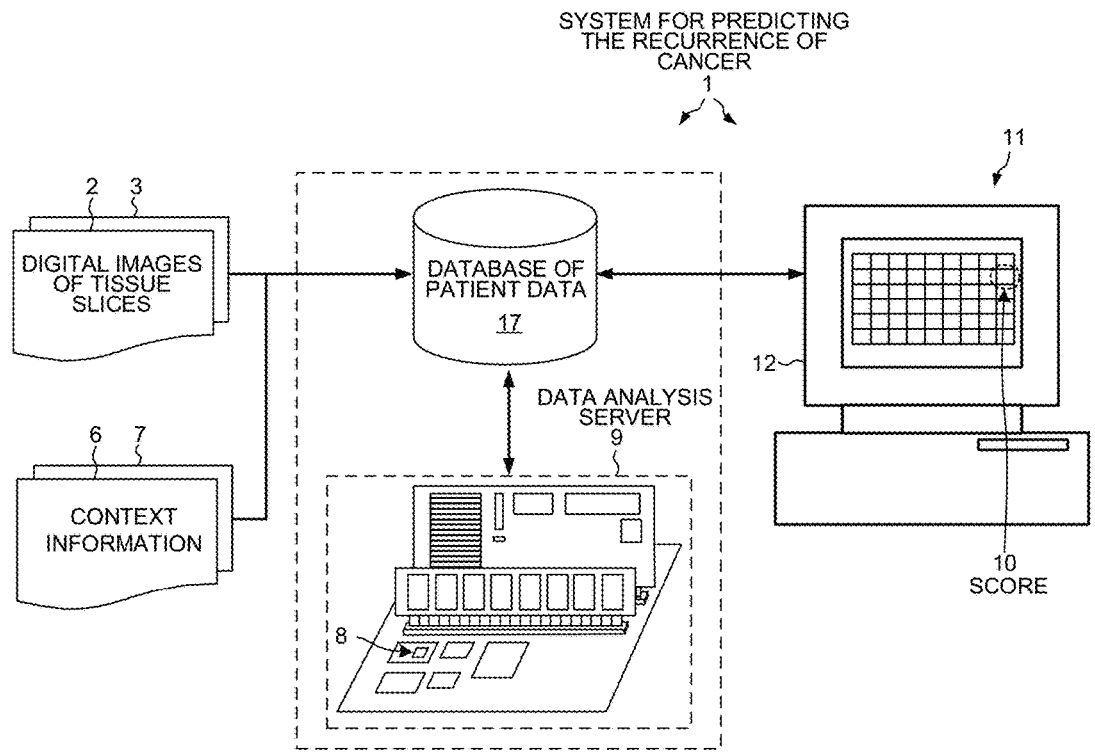
FIG. 1 is a diagram of a system for predicting the recurrence of cancer.

FIG. 1 is a conceptual diagram of a system 1 for analyzing stained slices of glandular tissue of a patient, and for generating a score, where the score indicates whether the patient is likely to suffer a recurrence of cancer. More particularly, in one example, the patient is a patient who has had prostate cancer and who has had a radical prostatectomy. Because the patient has had his prostate removed, and because the prostate glands that produce PSA (Prostate-Specific Antigen) are no longer in the patient's body, the blood of the patient after the operation should not contain any PSA. If, however, substantial PSA is later detected in the patient's blood, this indicates that despite the radical prostatectomy some prostate cancer cells nevertheless remained in the patient's body. A few prostate cells may, for example, have migrated from the prostate to other parts of the body so that when the radical prostatectomy was performed, the other prostate cells remain. Initially after the radical prostatectomy no PSA may be detected in the patient's blood, but then after a period of time cancerous PSA producing cells may reproduce or grow to the point that PSA is again detectable in the patient's blood. This is referred to as "PSA recurrence". PSA recurrence correlates to the recurrence of aggressive cancer, and therefore can be used to evaluate if the patient will live, and if the patient will live how long the patient will live. For a person afflicted with cancer, knowing such information can be very important. System 1 not only can predict whether the patient will likely have PSA recurrence, but it can also do so at the time of the radical prostatectomy.

Digital images 2 and 3 are taken of a sample 4 of glandular tissue of the patient 5. These digital images 2 and 3 are supplied as inputs to the system 1. In addition, context information 6 and 7 is supplied to the system 1. The context information 6 may, for example, include medical history information for patient 5. The digital images 2 and 3, the context information 6 and 7, as well as image analysis software 8 is stored on server 9. The image analysis software 8 is a set of computer-readable instructions that is stored in a non-transitory manner on a computer-readable medium (for example, in semiconductor memory and/or on a magnetic hard disc) in the server 9. The system 10, by virtue of a processor of its server 9 executing the software 8, analyzes the digital images 2 and 3 and uses the context information 6 and 7 to generate a score 10. The score 10 is indicative of whether the patient will have PSA recurrence. A physician or laboratory person or other health care professional can use a network-connected computer 11 to view the score 10 and to interact with the system 1. The score 10 is displayed on the display 12 of the computer 11.

Figure 2:
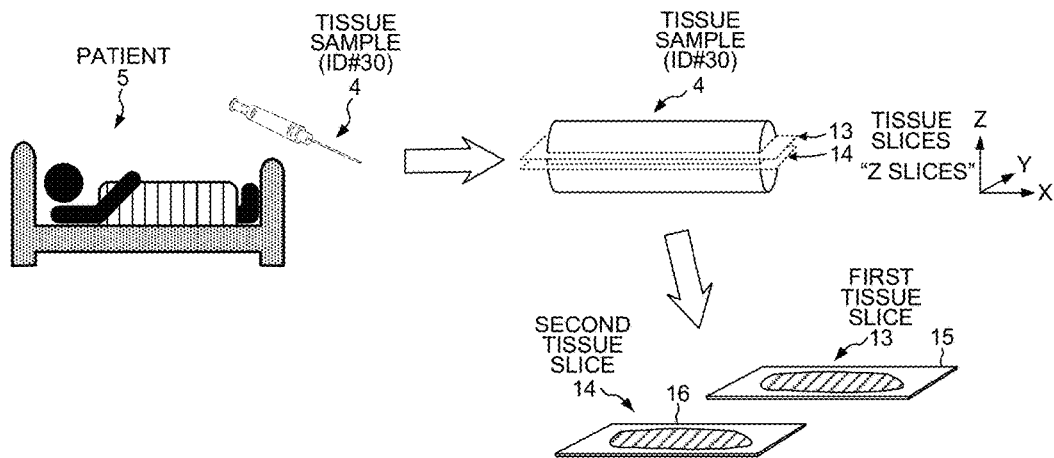
FIG. 2 illustrates one example of how first and second digital images can be generated from a tissue sample taken from a patient, where the first and second digital images are supplied as inputs to the system of FIG. 1.

FIG. 2 is a diagram that illustrates one example of how the digital images 2 and 3 are made. In one example, the sample 4 of tissue is tissue that has been surgically removed from the patient 5. In another example, the sample 4 of tissue is taken from the patient 5 in the form of a needle biopsy. Once obtained from the patient, the sample 4 is then sliced into adjacent thin slices. Two such slices 13 and 14 are illustrated. Because the slices are very thin, each adjacent slice contains practically the same tissue structures. The slices are located at the same position of the tissue sample in the x and y dimensions, but the slices located at very slightly different altitudes in the z dimension. The slices are called "z slices" because they depict different z altitudes at the same position in the x and y dimensions of the tissue sample.

Figure 3:
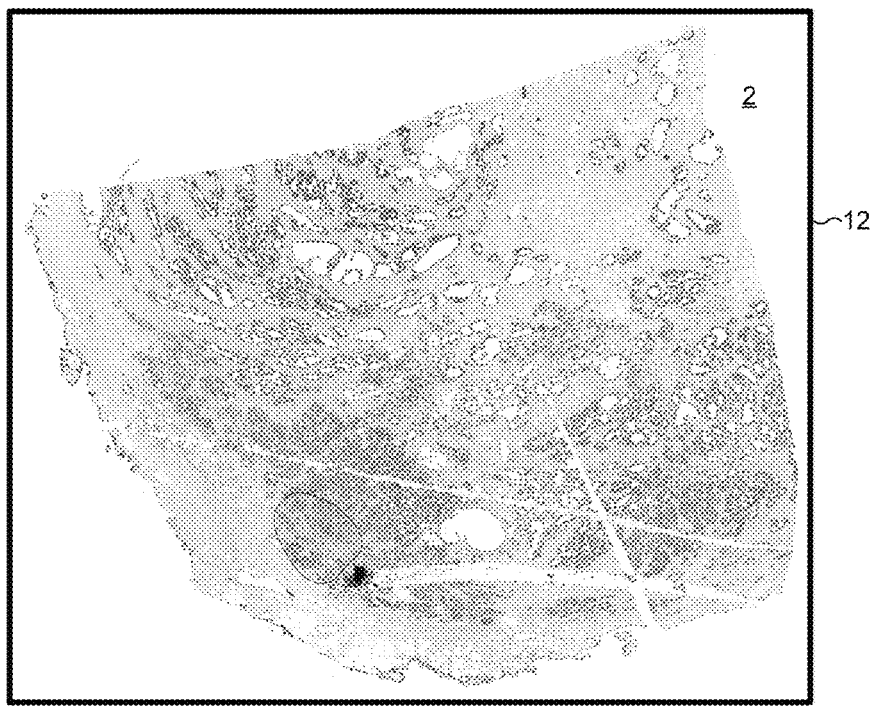
FIG. 3 is a grayscale version of the first digital image.

In the example illustrated, the first slice 13 is stained with two biomarkers. This is referred to as a "double stain" or "duplex staining". The first biomarker of the double stain is a CK18 antibody stain that stains luminal epithelial prostate gland cells. The CK18 stain may, for example, be a stain referred to as #ab32118, available from ABCAM, 1 Kendall Square, Suite B2304, Cambridge, Mass. 02139. The second biomarker of the double stain is a p63 antibody stain that stains basal epithelial prostate gland cells. The p63 stain may, for example, be a stain referred to as #CM163B, available from Biocare Medical, 4040 Pike Lane, Concord, Calif. 94520. Due to this double staining, individual luminal epithelial cells of the first slice 13 appear brown when the slice is viewed under magnification, whereas individual basal epithelial cells of the first slice 13 appear red when viewed under magnification. After staining, the first slice 13 is placed on a first microscope slide 15. A first high resolution color digital image 2 is then taken of the first stained slice. FIG. 3 is a grayscale version of the first digital image 2 as displayed on the graphical user interface 12 of the computer 11.

Figure 4:
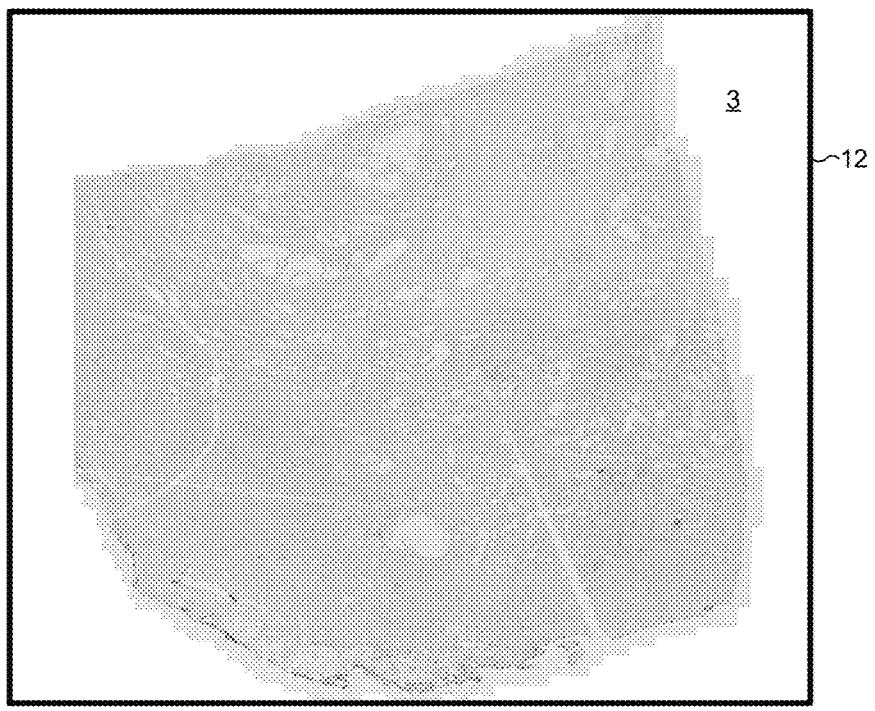
FIG. 4 is a grayscale version of the second digital image.

In the illustrated example, the second slice 14 is also double stained. The first biomarker of the double stain is a CD68 antibody stain, and the second biomarker of the double stain is a CD163 antibody stain. The CD68 stain may, for example, be a stain referred to as #M087601-2, available from Dako North America, Inc., 6392 Via Real, Carpinteria, Calif. 93013. The CD163 stain may, for example, be a stain referred to as #760-4437, available from Ventana Medical Systems, Inc., 1910 Innovation Park Drive, Tucson, Ariz. 85755. Due to this double staining, individual tumoricidal M1 type macrophages appear red when the second slice 14 is viewed under magnification, and individual tumorigenic M2 type macrophages appear brown when the second slice 14 is viewed under magnification. After staining, the second slice 14 is placed on a second slide 16. A second high resolution color digital image 3 is then taken of the second stained slice. FIG. 4 shows a grayscale version of the second digital image 3 displayed on the graphical user interface 12 of the computer 11.

A typical human macrophage is only about twelve microns in diameter, but macrophages in their very active form such as those found in tumors are typically larger at twenty to thirty microns in diameter. The resolution of each of the first and second digital images is the same. In one example, the resolution of both images is 0.22 microns per pixel. The resolutions of the two digital images 2 and 3 are the same so that pixels in the two digital images can be co-registered to each other. The first and second digital images 2 and 3 are supplied to the system 1 and are stored in the database 17. Each digital image is typically received by the system in the form of a digital image file, and the file is stored in the database 17. In the illustrated example, system 1 includes server 9, database 17, and computer 11.

The system 1 analyzes the first digital image 2 and generates luminal cell objects. Each luminal cell object corresponds to an individual luminal epithelial cell. As mentioned above, luminal cells are stained brown. Luminal epithelial cells are about twelve to sixteen microns in diameter. Brown pixels of the first digital image are analyzed, and those brown pixels that satisfy a first predetermined spatial relationship to one another are determined to correspond to a luminal cell object. The first predetermined spatial relationship may, for example, be a relationship in which each of the pixels is not more than a predetermined distance (specified in pixels) from another of the pixels. More particularly, the luminal cell object corresponds to certain pixels in the first digital image that in turn correspond to an individual luminal epithelial cell. For each such individual luminal epithelial cell in the first digital image, a corresponding luminal cell object is generated.

Next, the system generates luminal cell-gland objects from the luminal cell objects. Each luminal cell-gland object corresponds to the luminal epithelial cells of a single gland. Luminal cells of the same gland in a tissue slice, if the gland is intact and healthy, are adjacent one another. Typically these adjacent luminal cells form a ring of luminal cells that surrounds a lumen. Those luminal cell objects that satisfy a second predetermined spatial relationship to one another are linked and associated to the luminal cell-gland object for the same gland. The second predetermined spatial relationship may, for example, be a relationship in which each of the luminal cell objects is adjacent another in such a way that the adjacent luminal cell objects form a chain or row, where the chain or row is closed and forms a ring or loop. A given luminal cell-gland object includes only those luminal cell objects that correspond to luminal cells of a single gland, and does not include any luminal cell object that corresponds to a luminal cell of any other gland.

Next, the system analyzes the first digital image 2 and generates basal cell objects. As mentioned above, basal epithelial cells in the first digital image are stained red. Basal epithelial cells are about 0.5 to 1.0 microns in diameter. Red pixels of the first digital image are analyzed, and those red pixels that satisfy a third predetermined spatial relationship to one another are determined to correspond to a basal cell object. The third predetermined spatial relationship may, for example, be a relationship in which each of the pixels is not more than a predetermined distance (specified in pixels) from another of the pixels. More particularly, the basal cell object corresponds to certain pixels in the first digital image that in turn correspond to an individual basal epithelial cell. Each basal cell object corresponds to an individual basal epithelial cell.

Next, the system identifies each luminal cell-gland object that has a fourth predetermined spatial relationship with respect to the basal cell objects. In one example, a luminal cell-glad object is determined to have this fourth predetermined spatial relationship with respect to the basal cell objects if there is no basal cell object disposed within a predetermined distance or separation of any part of the luminal cell-gland object. In one example, this predetermined distance is 150 microns. This 150-micron distance in pixels, at a resolution of 0.22 microns per pixel, is about 680 pixels of the second digital image. In this way, each luminal gland-cell object is classified to be in one of two groups. The first group includes the luminal cell-gland objects that satisfy the fourth predetermined spatial relationship with respect to the basal cell objects. The luminal cell-gland objects of this first group may be referred to as "non-intact" luminal cell-gland objects. The second group includes the luminal cell-gland objects that do not satisfy the fourth predetermined spatial relationship with respect to the basal cell objects. Luminal cell-gland objects of this second group may be referred to as "intact" luminal cell-gland objects.

Next, the system analyzes the non-intact luminal cell-gland objects and generates non-intact gland objects. Each such non-intact gland object corresponds to certain pixels in the first digital image that in turn correspond to the luminal cell-gland object of the gland and to any associated artifacts or nearby basal cell objects of the gland beyond the 150-micron distance. In this step, gland remnants and artifacts that are close to the pixels of non-intact gland object are considered part of the non-intact gland object.

Figure 5:
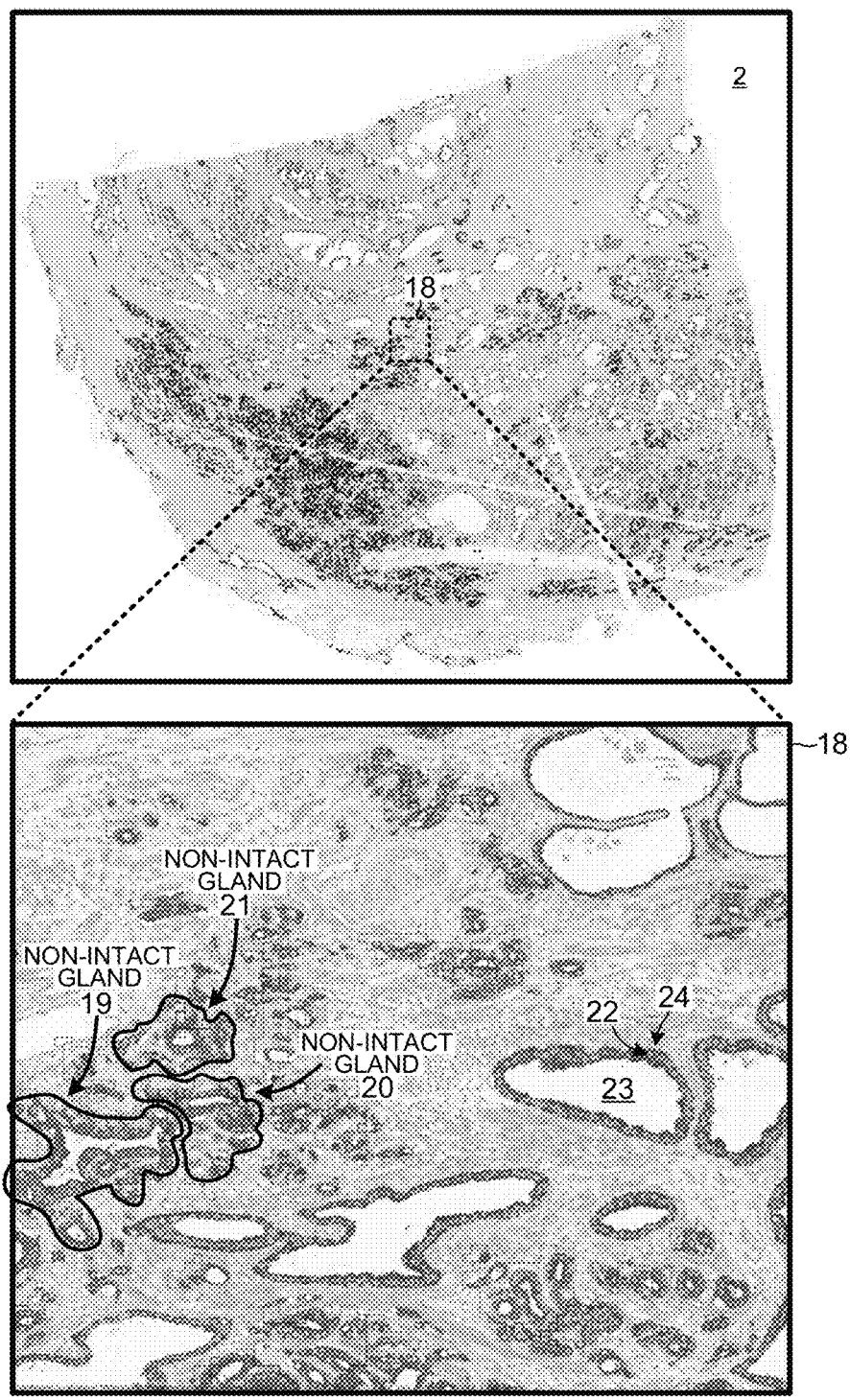
FIG. 5 illustrates the generating of non-intact gland objects.

FIG. 5 shows the first digital image 2 in the upper half of the diagram. The part of the first digital image 2 indicated in the square 18 in the upper half of the diagram is shown in expanded form in the bottom half of the diagram. Although the actual first digital image 2 is a color image, due to restrictions on color images in patents the image of the upper half of the diagram and the expanded section of the image of the bottom half of the diagram are shown in grayscale.

Reference numeral 19 identifies the pixel region of the first digital image that corresponds to a first non-intact gland object. Reference numeral 20 identifies the pixel region of the first digital image that corresponds to a second non-intact gland object. Reference numeral 21 identifies the pixel region of the first digital image that corresponds to a third non-intact gland object. Reference numeral 22 identifies one luminal epithelial cell of a ring of luminal epithelial cells. The ring of luminal epithelial cells surrounds a lumen 23 of a gland. Reference number 24 identifies one basal cell of the same gland. A basal cell is smaller than a luminal cell, so in FIG. 5 the basal cell 24 is a relatively small object disposed on the outside of the luminal epithelial cell 22 with respect to the lumen 23. In a healthy prostate gland, there is a ring of these smaller basal epithelial cells that surrounds the ring of the larger luminal epithelial cells.

Figure 6:
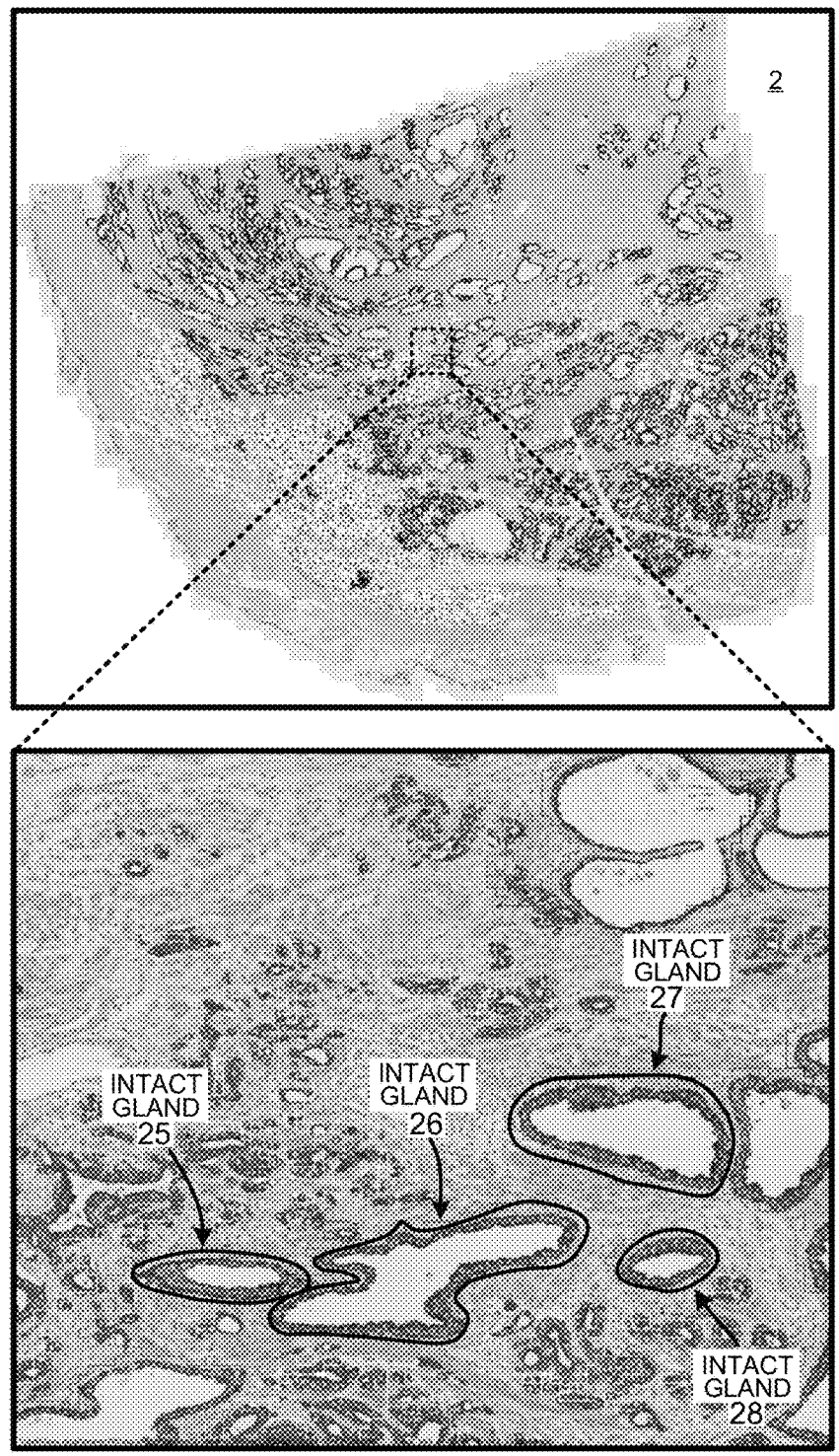
FIG. 6 illustrates the generating of intact gland objects.

Next, the system analyzes the intact luminal cell-gland objects and generates intact gland objects. Each such intact gland object corresponds to certain pixels in the first digital image 2 that in turn correspond to the luminal cell-gland object of the gland and to the basal cell objects of the gland. In FIG. 6, reference numeral 25 identifies the pixel region of the first digital image 2 that corresponds to a first intact gland object. Reference numeral 26 identifies the pixel region of the first digital image that corresponds to a second intact gland object. Reference numeral 27 identifies the pixel region of the first digital image that corresponds to a third intact gland object. Reference numeral 28 identifies the pixel region of the first digital image that corresponds to a fourth intact gland object. For additional information on how to generate non-intact gland objects, how to generate intact gland objects, and how to distinguish non-intact glands from intact glands, see: U.S. Pat. No. 8,879,819, entitled "Gleason Grading By Segmenting And Combining Co-Registered Images Of Differentially Stained Tissue Slices", filed Dec. 19, 2012, by Athelogou et al. (the entire subject matter of which is incorporated herein by reference).

Figure 7:
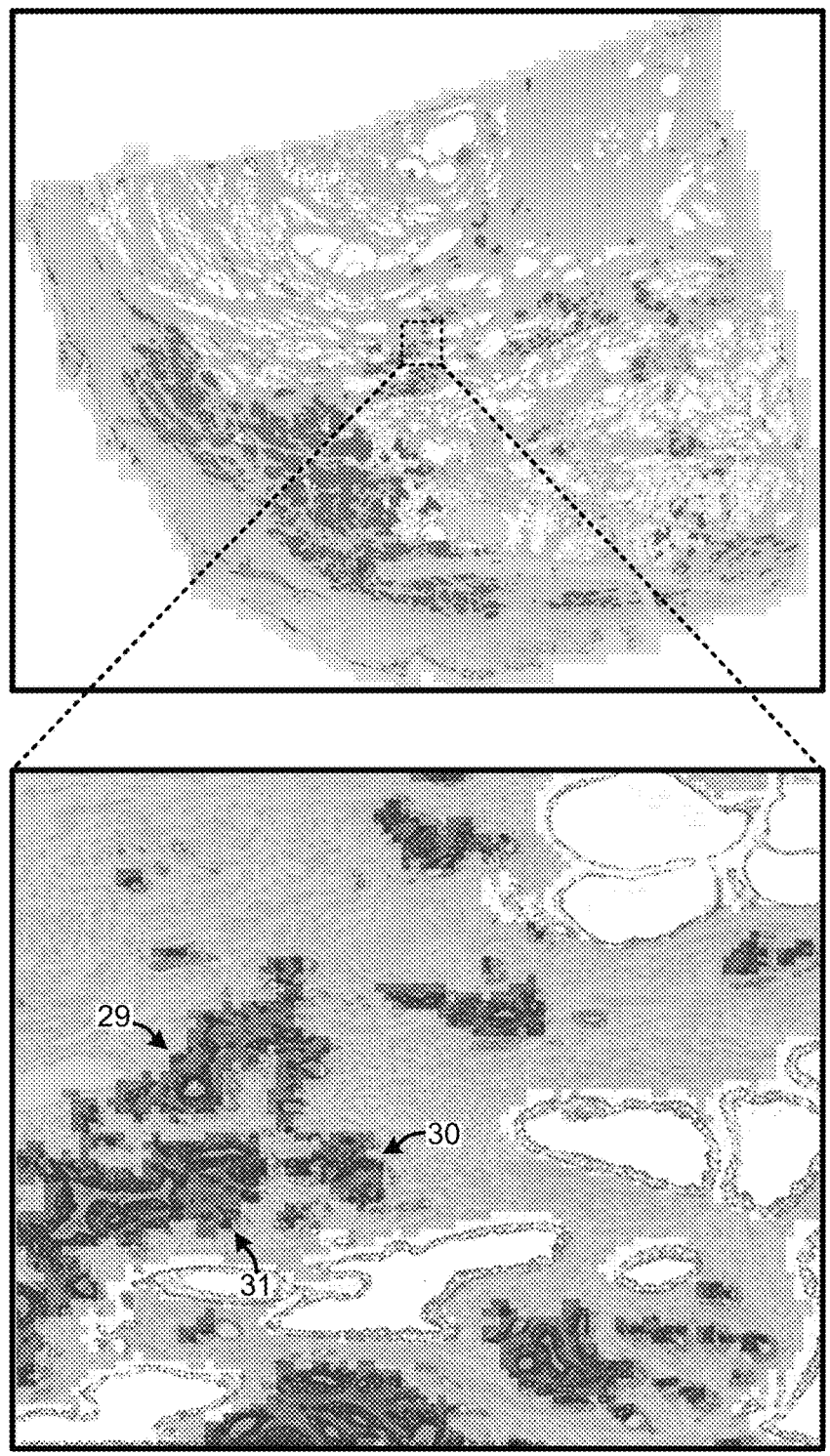
FIG. 7 illustrates an aggregation of pixel regions corresponding to non-intact gland objects, thereby generating a non-intact region mask.

Next, the regions of the first digital image that correspond to the non-intact gland objects are aggregated. This aggregation forms a non-intact region mask. This mask, when applied to a digital image, defines pixel areas of the digital image to correspond to non-intact glands. In FIG. 7, the pixel regions that make up the non-intact region mask are shown with darker (brown) shading. Reference numerals 29-31 identify three of these non-intact regions.

Figure 8:
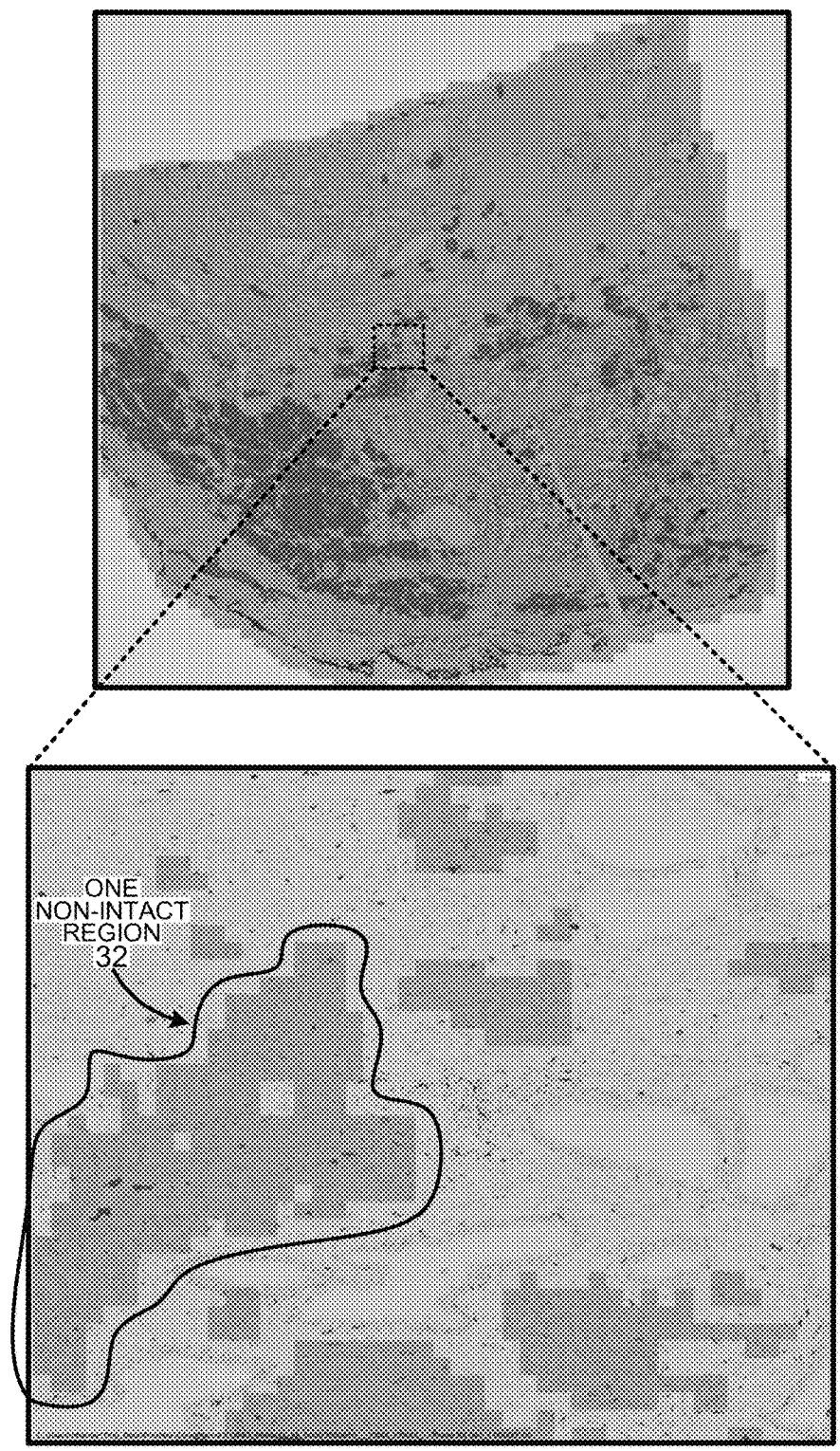
FIG. 8 illustrates the transferring of the non-intact region mask onto the second digital image, thereby defining non-intact regions of the second digital image.

Next, the information of the non-intact region mask is reduced in resolution, and the resulting lower-resolution non-intact region mask is transferred and applied to the second digital image 3. FIG. 8 depicts the result. The non-intact region mask as applied to the second digital image 3 defines certain pixel regions of the second digital image as being so-called "non-intact regions". In FIG. 8, the non-intact regions are shown with darker shading. Reference numeral 32 identifies one such non-intact region. Other pixel areas are shown with lighter shading. As a result of the reduction in resolution of the mask prior to transferring, the minimum block size of the darker non-intact regions in FIG. 8 is larger than the minimum block size in the darker portions of FIG. 7.

In the description below, when the term "pixel" is used in referring to a mask, it is understood that the term is referring to the smallest block size of the mask. In the description below, when the term "pixel" is used in referring to a digital image, the term is referring to the actual finer resolution pixel of the actual digital image. When a mask is applied to a digital image, a pixel of the mask corresponds to and defines an area of pixels of the underlying finer resolution digital image. The shrinking and expanding operations described below are carried out on the basis of mask pixels.

Figure 9:
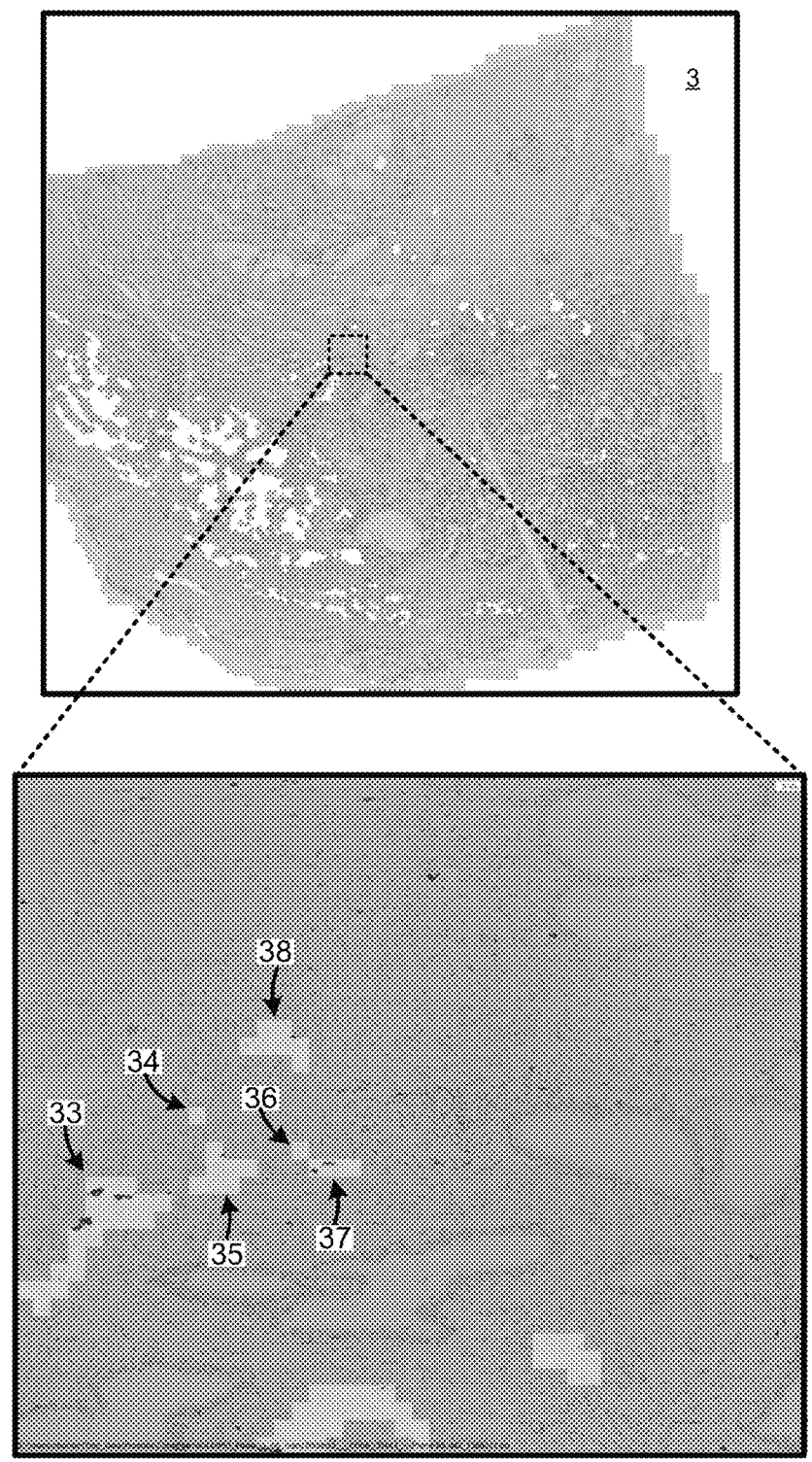
FIG. 9 illustrates a first shrinking operation performed on non-intact regions of the second digital image.

Next, a first shrinking operation is performed on the non-intact regions of the second digital image 3. FIG. 9 shows the result of this first shrinking operation. Reference numerals 33-38 identify several non-intact regions that result after the first shrinking operation. In this diagram the non-intact region pixels are shown with lighter shading, whereas other pixels are shown with darker shading. As can be seen by comparing the non-intact regions of FIG. 8 and FIG. 9, the first shrinking operation of FIG. 9 results in a loss of small non-intact regions. The first shrinking operation can also result in severing a single non-intact region into multiple smaller non-intact regions. To carry out the first shrinking operation, each pixel of a non-intact region is considered independently. If the pixel is bordering a pixel that is not part of a non-intact region, then the mask is adjusted so that the pixel is no longer part of the non-intact region. In the color scheme of FIG. 9, this adjusting of the mask is manifest in the pixel changing from the lighter color (of a non-intact region) to the darker color (of regions that are not non-intact regions). Each pixel of the entire merged mask for the second digital image is treated in this way, on a pixel-by-pixel basis. By this first shrinking operation, the outer border of a non-intact region is moved inward, and a hole in a non-intact region is made larger. In the illustrated example, the amount of the first shrinking operation is 350 times 0.22 microns.

Figure 10:
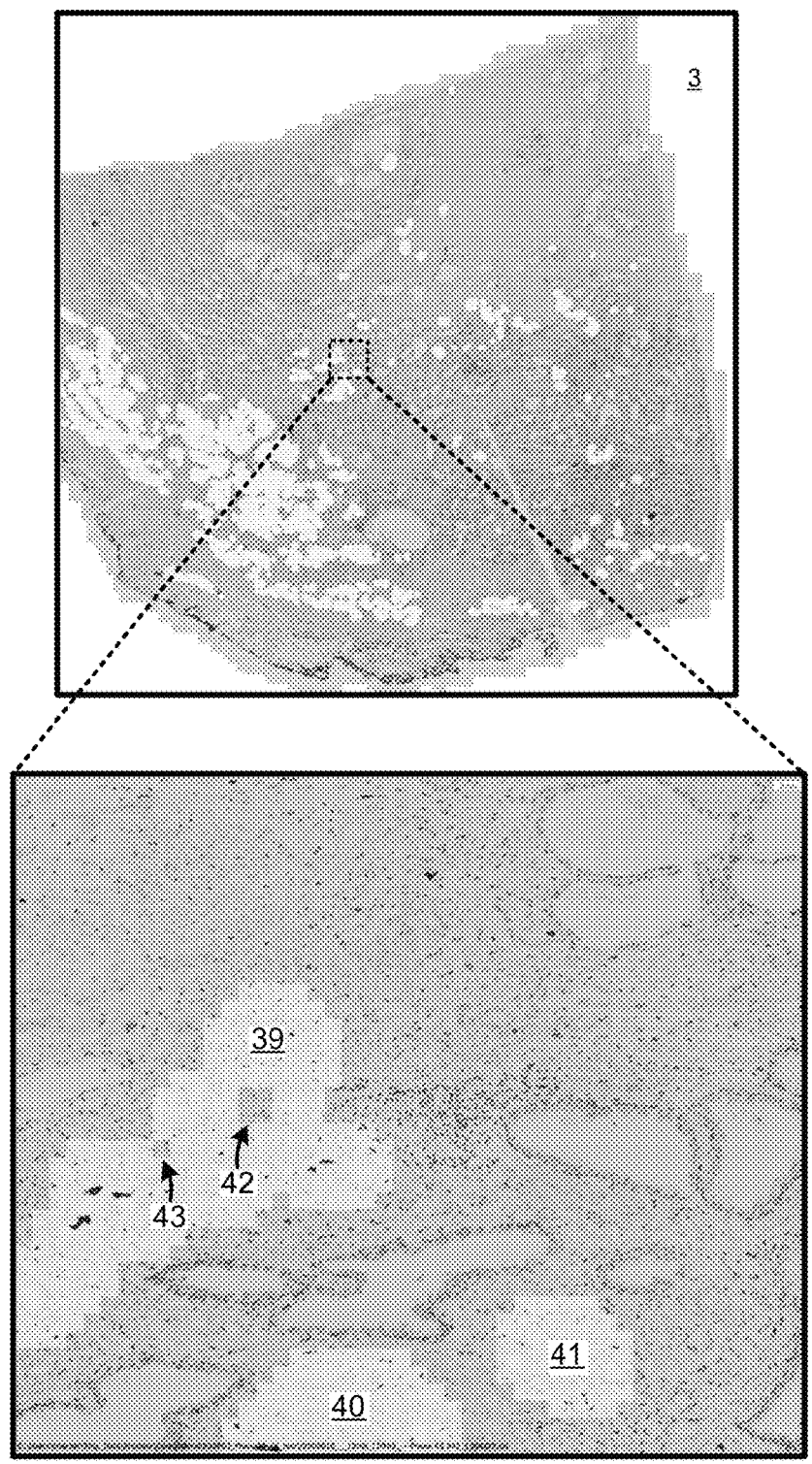
FIG. 10 illustrates a first expanding operation performed on non-intact regions of the second digital image.

Next, a first expanding operation is performed on the non-intact regions. FIG. 10 shows the result of this first expanding operation. On a pixel-by-pixel basis, pixels of the second digital image are examined. If a pixel of a non-intact region has a neighboring pixel that is not of a non-intact region, then the non-intact region mask is adjusted so that the neighboring pixel is now a non-intact region pixel. In the color scheme of FIG. 10, the neighboring pixel is changed from the darker color (of a region that is not a non-intact region) to the lighter color (of a non-intact region). Again, the pixels mentioned here are actually blocks of pixels of the underlying second digital image 3, where each block corresponds to a pixel of the non-intact region mask. Reference numerals 39-41 identify three of the non-intact regions that result from this first expanding operation. In the illustrated example, the amount of the first expanding operation is 350 times 0.22 microns.

Figure 11:
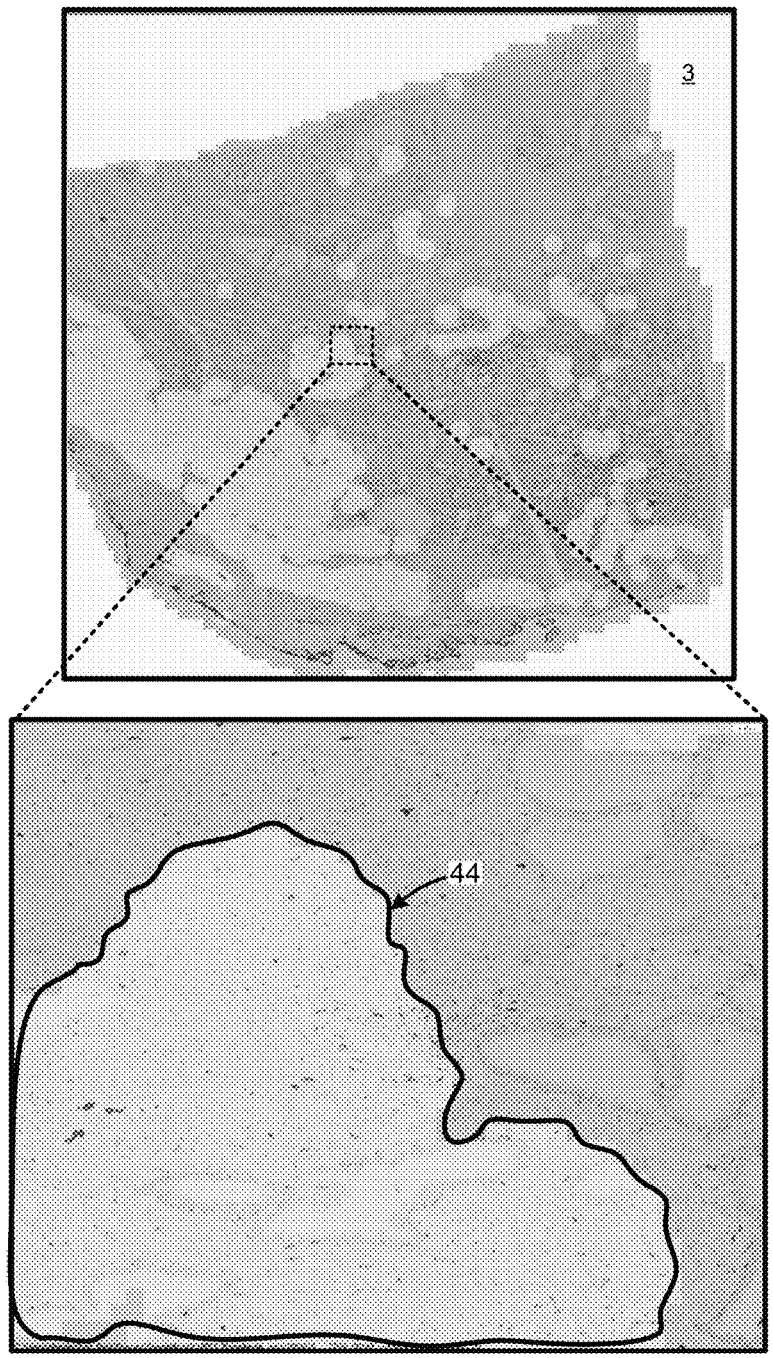
FIG. 11 illustrates a second expanding operation performed on non-intact regions of the second digital image.

Next, a second expanding operation is performed on the non-intact regions of FIG. 10. FIG. 11 shows the result of this second expanding operation. This second expanding operation results in the closing any small hole within a non-intact region. For example, the holes 42 and 43 of FIG. 10 are no longer present in FIG. 11 after the second expanding operation. The three non-intact regions 39, 40 and 41 of FIG. 10 are combined and merged into a single non-intact region 44. In the illustrated example, the amount of the second expanding operation is 640 times 0.22 microns.

Figure 12:
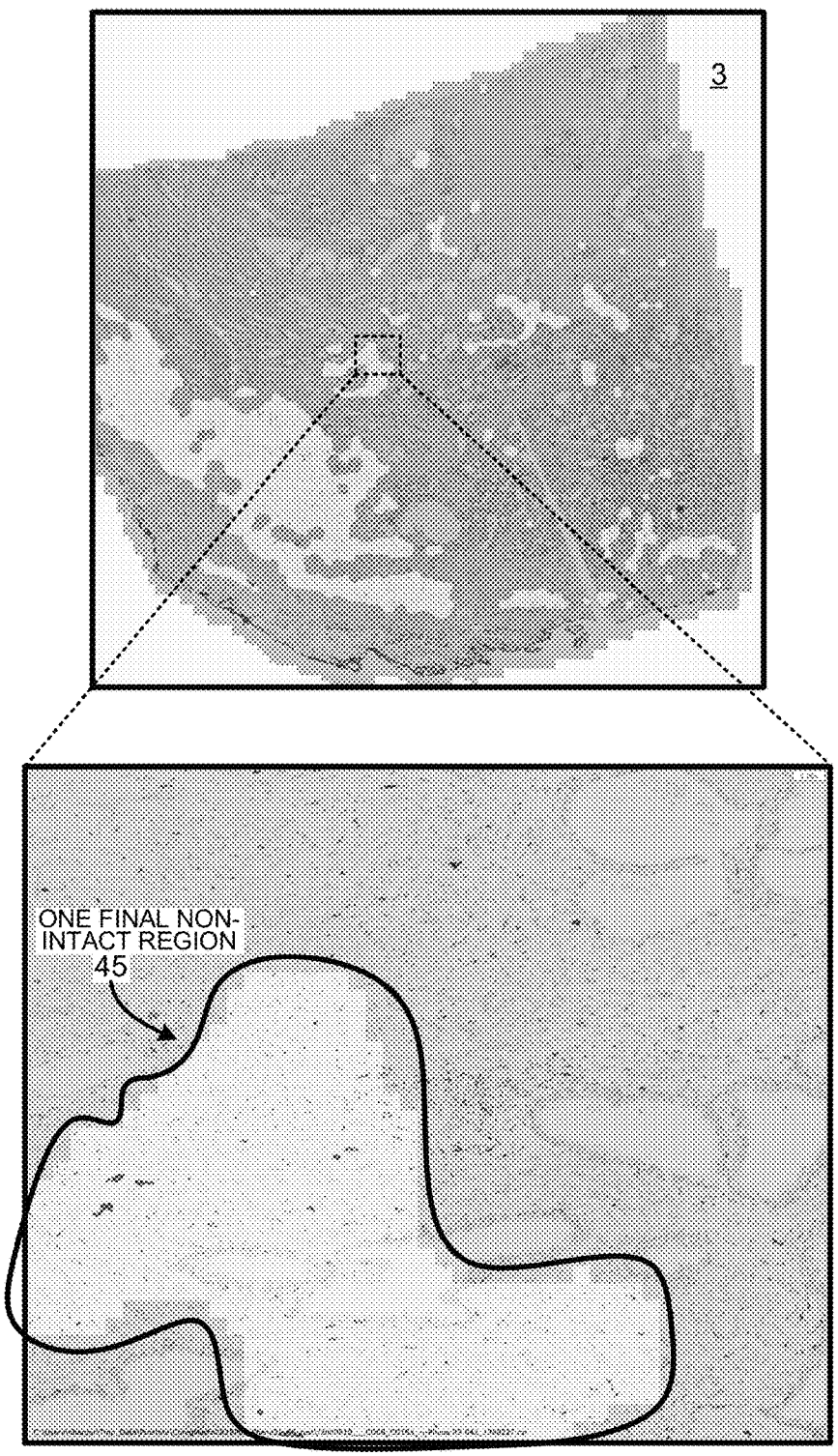
FIG. 12 illustrates a second shrinking operation performed on non-intact regions of the second digital image.

Next, a second shrinking operation is performed on the non-intact regions. FIG. 12 shows the result of this second shrinking operation. Reference numeral 45 identifies one of the non-intact regions of the second digital image that results after the second shrinking operation. In the illustrated example, the amount of the second shrinking operation is 640 times 0.22 microns.

Figure 13:
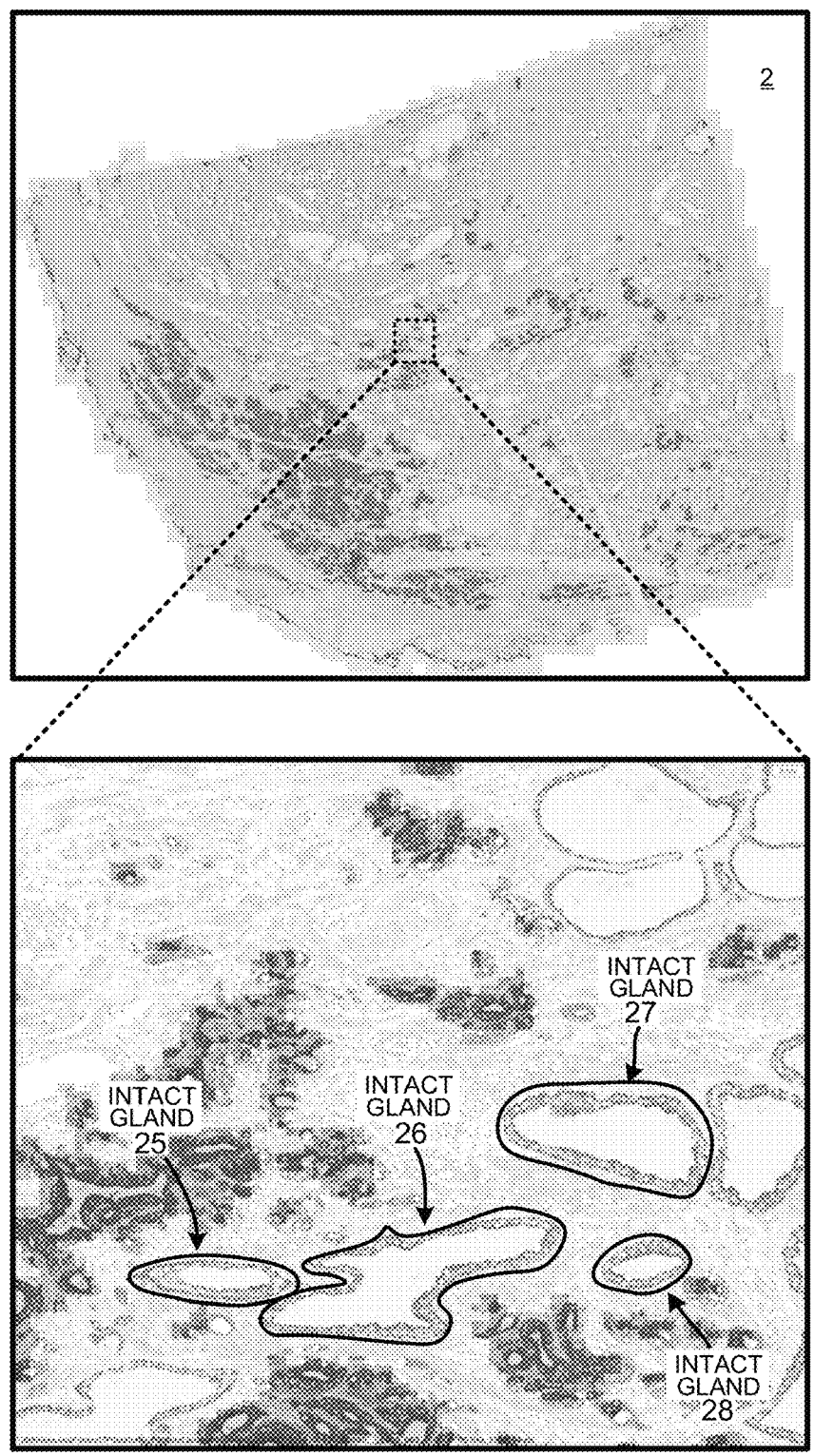
FIG. 13 illustrates an aggregation of pixel regions corresponding to intact gland objects, thereby generating an intact region mask.

Next, the regions of the first digital image 2 that correspond to the intact gland objects are aggregated. This aggregation step is like the aggregation step of FIG. 7, except that in the aggregation step of FIG. 13 it is the regions of the intact gland objects that are aggregated. In the color scheme of FIG. 13, the aggregated pixel regions that make up the intact region mask are shown with lighter shading. Four of these lighter intact regions are identified by reference numerals 25-28. These four intact regions are the same regions as shown in FIG. 6. The resulting intact region mask defines all the areas of intact glands.

Figure 14:
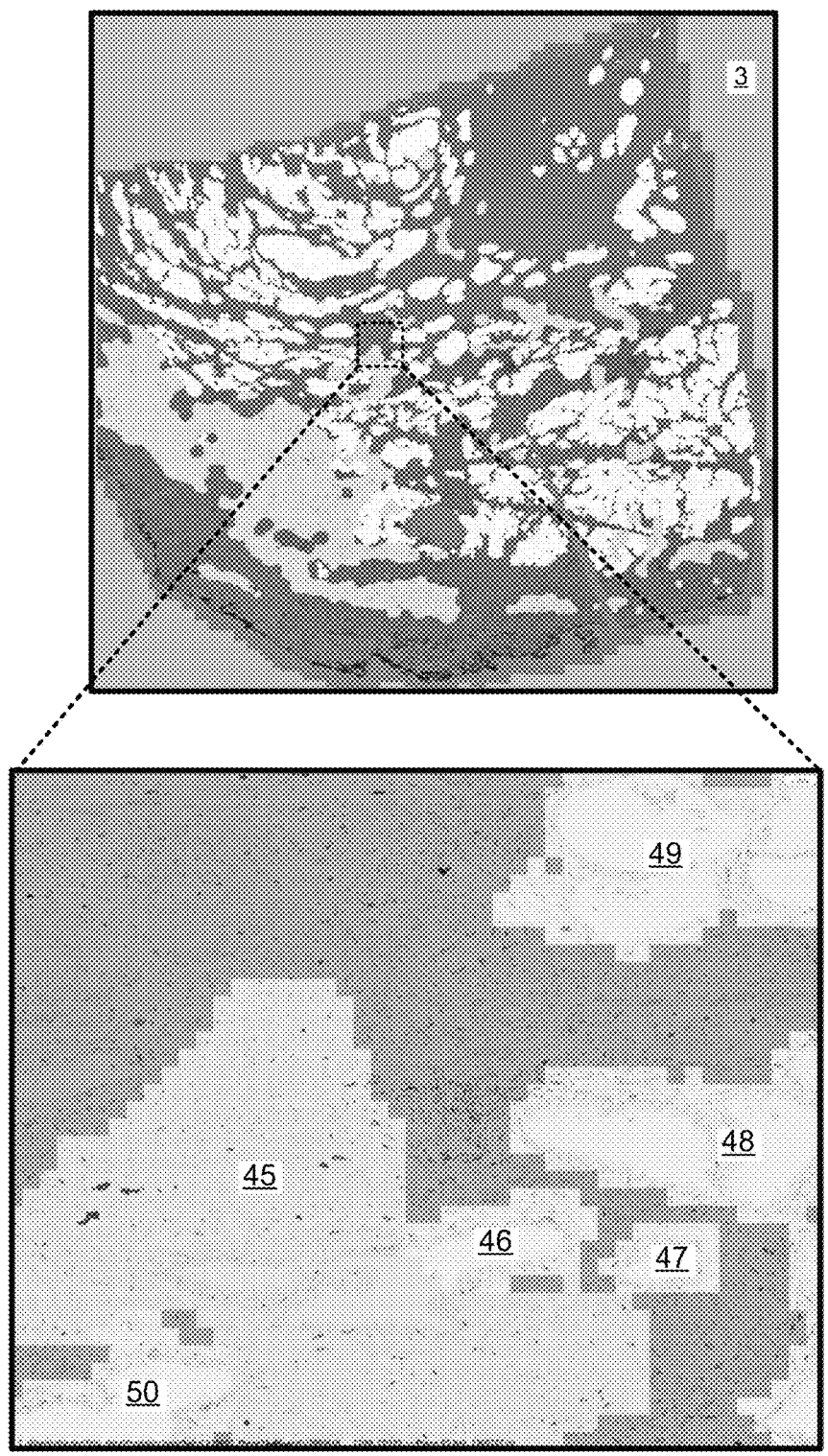
FIG. 14 illustrates the transferring of the intact region mask onto the second digital image, thereby defining intact regions of the second digital image.

Next, the information of the intact region mask is reduced in resolution, and the resulting lower-resolution mask is transferred onto and applied to the second digital image 3. FIG. 14 depicts the result. The intact region mask as applied to the second digital image 3 defines certain pixel regions of the second digital image as being so-called intact regions. In FIG. 14, the intact regions are shown with lighter shading. Reference numerals 46-50 identify five such lighter intact regions. When the intact region mask is applied to the second digital image, a given pixel area of the second digital image 3 may already have been defined as being part of a non-intact region. The transferring of the intact region mask onto the second digital image 3 is performed such that no pixel that was previously defined as being a part of a non-intact region will be redefined as being a part of an intact region. In this sense, the previous defining of a pixel of the second digital image 3 as being of a non-intact region takes precedence over any inconsistent subsequent defining of that pixel in the currently described transferring step. Note that the non-intact region 45 as shown in FIG. 14 is of the same size and shape as it appears in FIG. 12.

Figure 15:
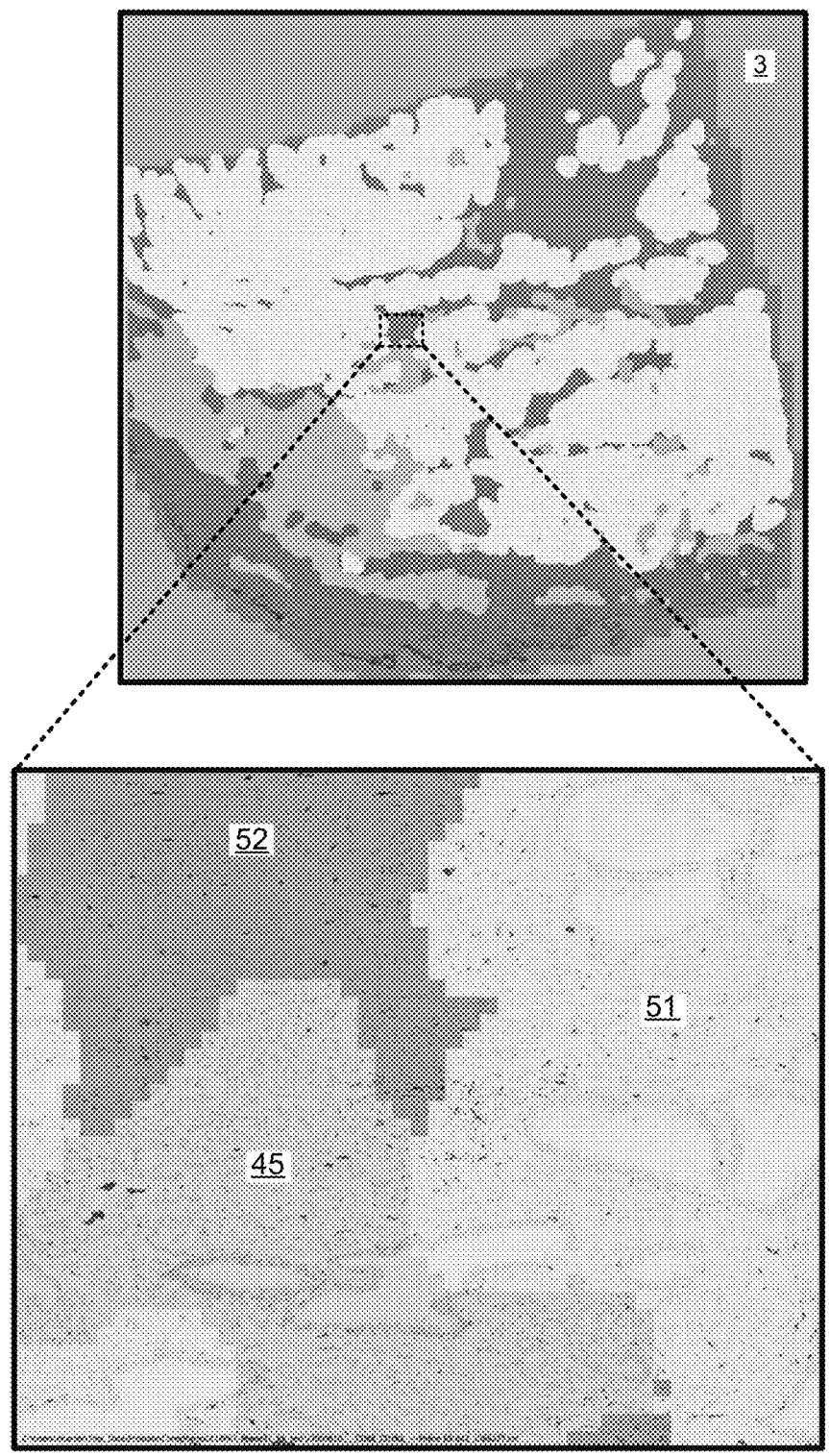
FIG. 15 illustrates an expanding operation performed on intact regions of the second digital image.

Next, an expanding operation is performed on the intact regions. FIG. 15 shows the result of this expanding operation. In the illustrated example, the amount of this expanding is 640 times 0.22 microns. Non-intact region 45 as shown in FIG. 15 is of the same size and shape as it appears in FIG. 14. The intact regions 46-49 of FIG. 14 have been combined into a single intact region 51. At this point in the process, there are three types of pixels in the second digital image: 1) pixels that correspond to non-intact regions, 2) pixels that correspond to intact regions, and 3) all the other pixels. If a pixel of an intact region (the light shade in FIG. 15) is neighboring a pixel that is neither a pixel of an intact region (the light shade in FIG. 15) nor a pixel of a non-intact region (the medium dark shade in FIG. 15), then the intact region mask is changed so that the neighboring pixel is changed to be an intact region pixel (it is changed to the light shade in FIG. 15). In the expanding step, an intact region is not allowed to expand into any non-intact region, but rather is only allowed to expand into a region that is not a non-intact region. Again, the pixels referred to here are the larger pixel blocks of the intact region mask, and not the fine resolution pixels of the digital image. In the example of FIG. 15, the light shaded intact region 51 is not allowed to expand into the medium dark shaded non-intact region 45, but is allowed to expand into the darker shaded region 52.

Figure 16:
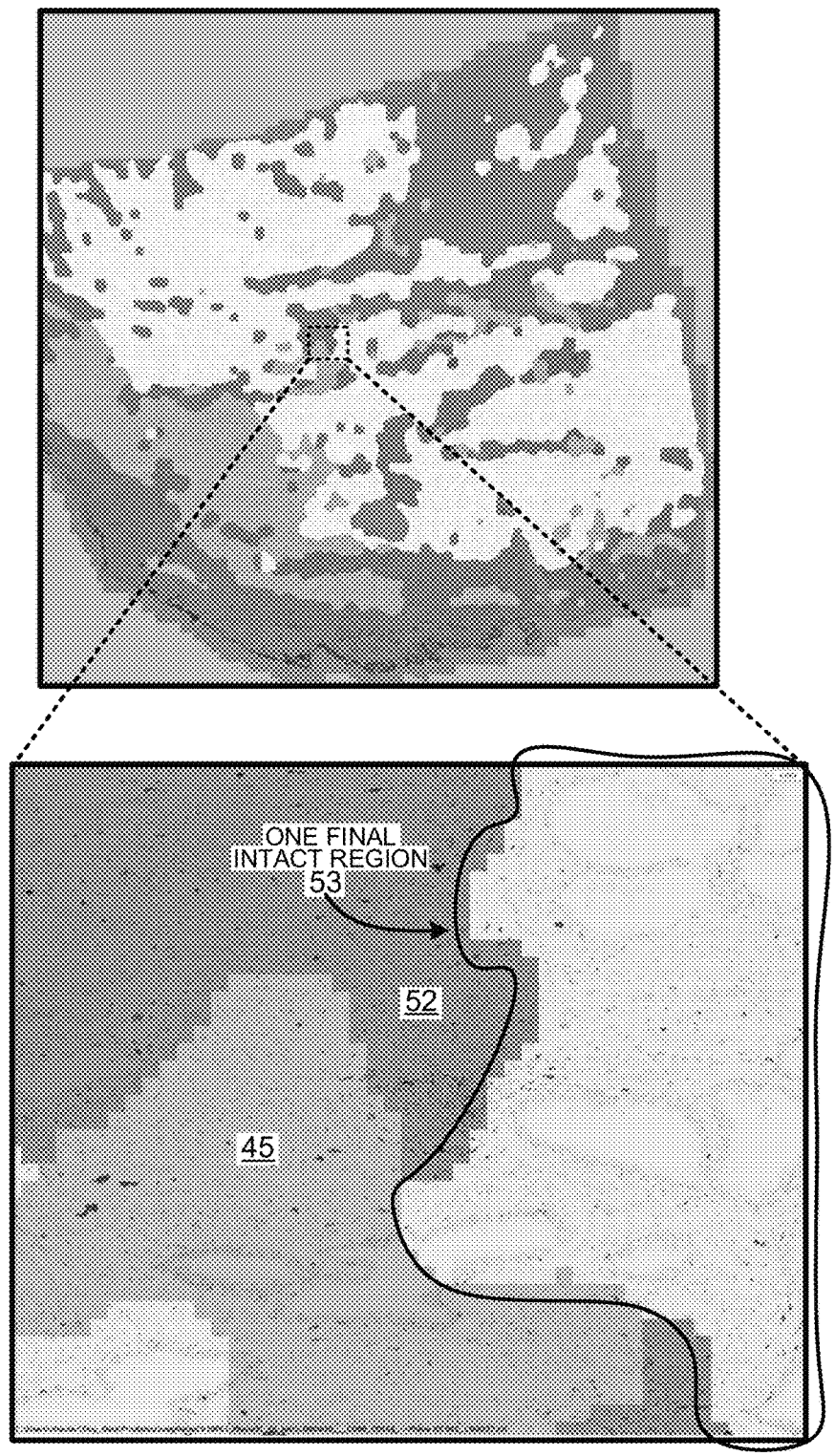
FIG. 16 illustrates a shrinking operation performed on intact regions of the second digital image.

Next, a shrinking operation is performed on the intact regions of the second digital image. FIG. 16 shows the result of this shrinking operation. In the illustrated example, the amount of this shrinking is 500 times 0.22 microns. If a pixel of an intact region (a lighter shaded pixel in FIG. 16) is neighboring one of the other pixels that is neither an intact region pixel (a lighter shaded pixel) nor a non-intact region pixel (a medium dark shaded pixel), then the intact region mask is changed so that the pixel (the darker shaded pixel) is changed to be an intact region pixel (a lighter shaded pixel). Reference numeral 53 identifies one of the intact regions of the second digital image that results after this shrinking operation. At this point in the process, the non-intact regions of the non-intact region mask are defined and finalized, and the intact regions of the intact region mask are defined and finalized.

Next, a tissue area boundary 54 is defined that surrounds the pixels that correspond to actual tissue in the image. If there are voids in the tissue, then this tissue area boundary 54 also is formed to exclude those void areas. The tissue area boundary 54 defines those areas of the digital image that are tissue, and are not voids, and are not outside the outer periphery of the tissue slice.

Figure 17:
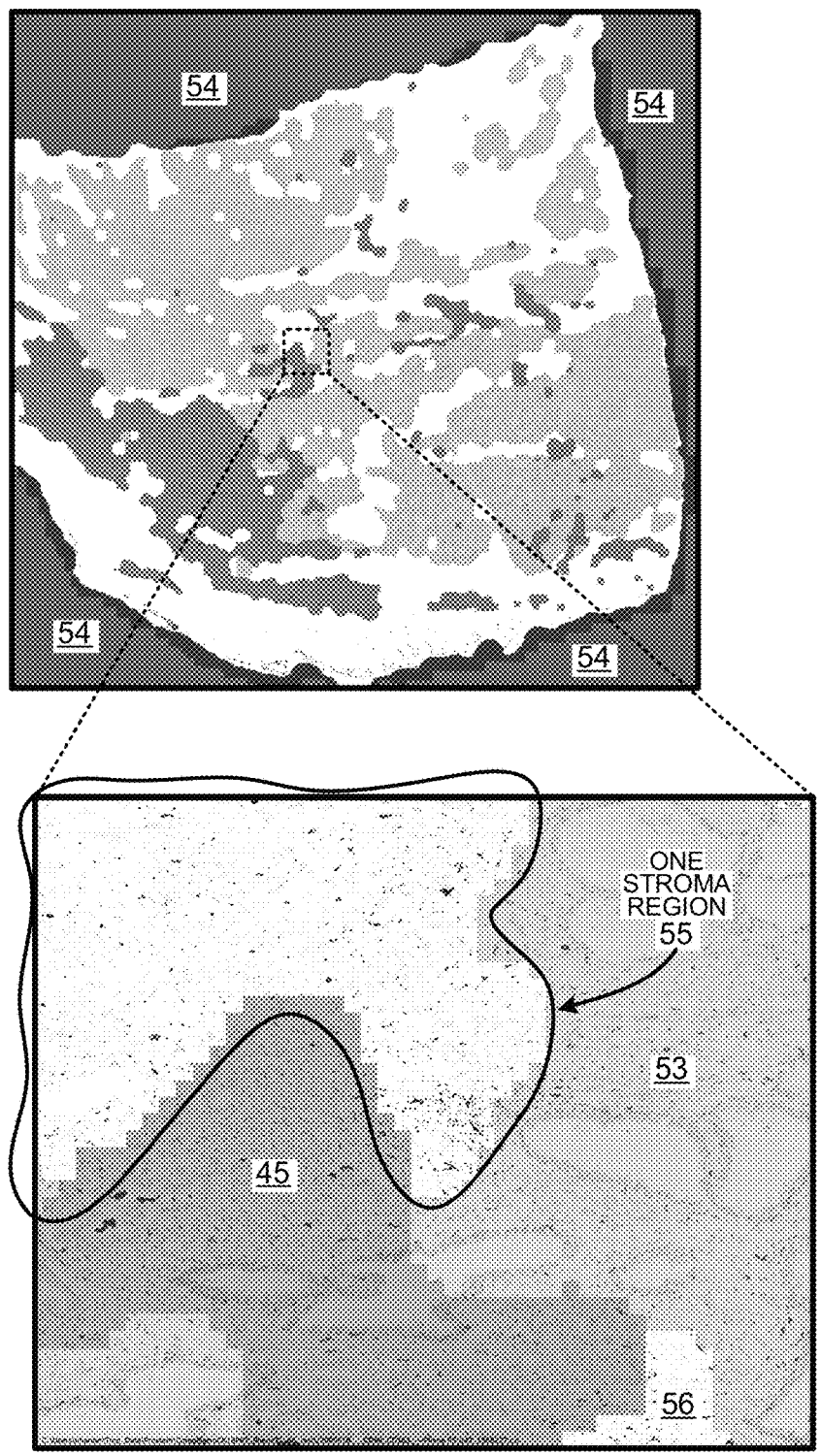
FIG. 17 illustrates how the non-intact region mask and the intact region mask are used to define stroma regions of the second digital image, and to define a stroma region mask.

Next, so-called stroma regions of the second digital image 3 are defined. Stroma regions are regions of the tissue that do not contain any glands. Within the tissue area defined by boundary 54, all pixels of the second digital image 3 that are neither part of a non-intact region (as determined by the non-intact region mask) nor a part of an intact region (as determined by the intact region mask) are defined to be stroma region pixels. The boundaries of the various stroma regions are considered together to be a single stroma region mask. FIG. 17 shows the result of the defining of the stroma regions. Reference numeral 55 identifies a part of one stroma region. Reference numeral 56 identifies a part of another stroma region.

Figure 18:
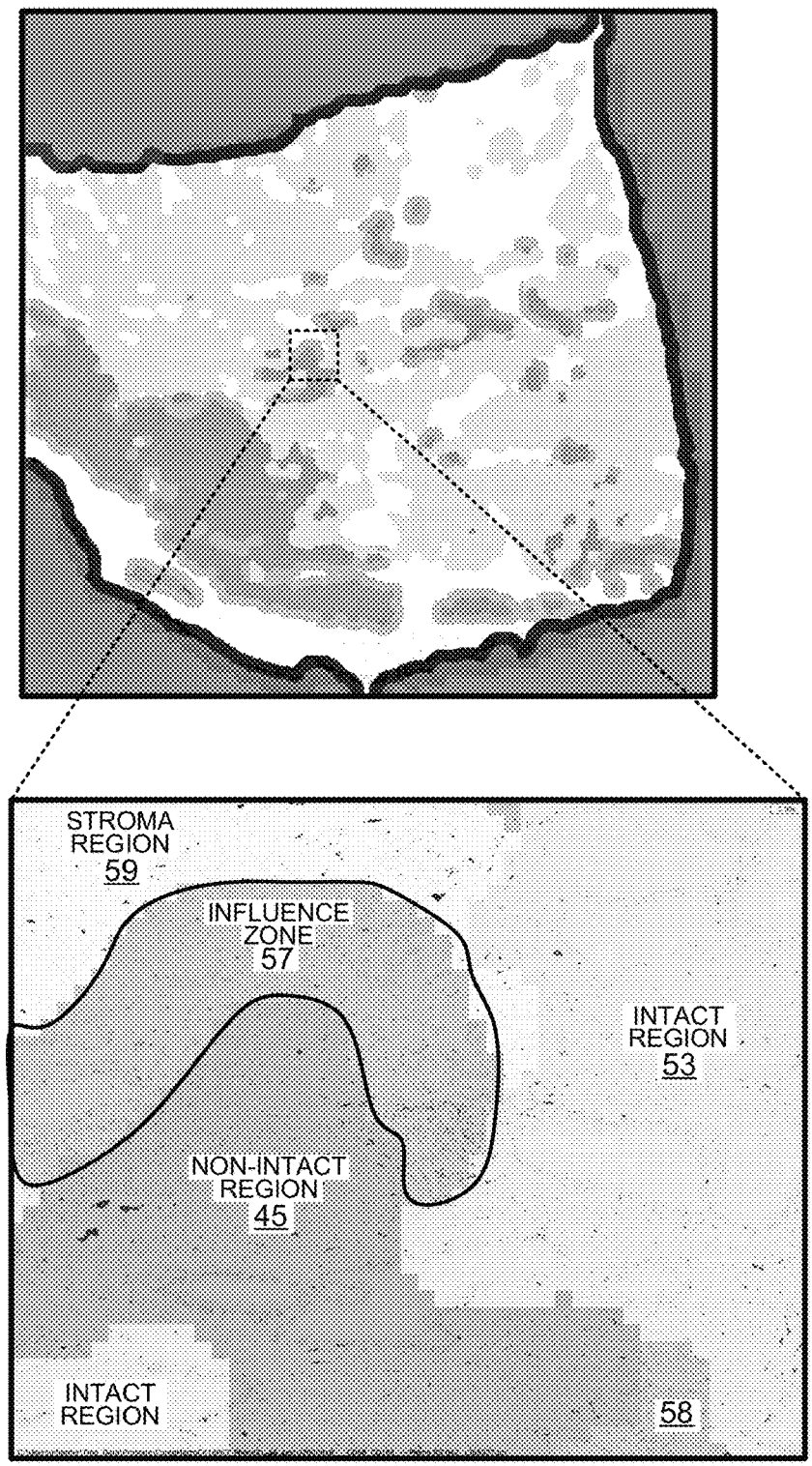
FIG. 18 illustrates how the system defines influences zones on boundaries between non-intact regions and stroma regions.

Next, influences zones are defined. The pixels of each stroma region are considered, one by one. If any pixel corresponding to a stroma region is adjacent to a pixel corresponding to a non-intact region, then the pixel is reclassified as no longer being a stroma region pixel but rather as being an influence zone pixel. Only pixels corresponding to stroma regions can be redefined in this influence zone defining step. The only mask that is changed in this influence defining step is the stroma region mask. In a next part of the influence zone defining step, the pixels corresponding to influence zones are considered. If any of these influence zone pixels is adjacent a pixel corresponding to a stroma region, then the stroma region pixel is reclassified as no longer being a stroma region pixel but rather as now being an influence zone pixel. As a result, the influence zone at the boundary of the non-intact region is made wider, and is made to extend another pixel distance into the stroma region. In this step, note that influence zones are not formed at the boundaries between non-intact regions and intact regions. Influence zones only grow and expand into stroma regions from the boundary between non-intact regions and stroma regions. In FIG. 18, reference numeral 57 identifies one of these influence zones. Reference numeral 58 identifies a part of another one of these influence zones. Because the influence zones grow into stroma regions, the stroma regions decrease in size and the stroma region mask is adjusted. Reference numeral 59 identifies one of the final stroma regions. All the influence zones together form an influence zone mask.

FIG. 18 shows the result after the influence zones have been defined. Reference numeral 57 identifies one influence zone, and reference numeral 58 identifies a part of another influence zone. Non-intact region 45 of FIG. 18 is the same as non-intact region 45 of FIG. 17. Intact region 53 of FIG. 18 is the same as intact region 53 of FIG. 19.

Figure 19:
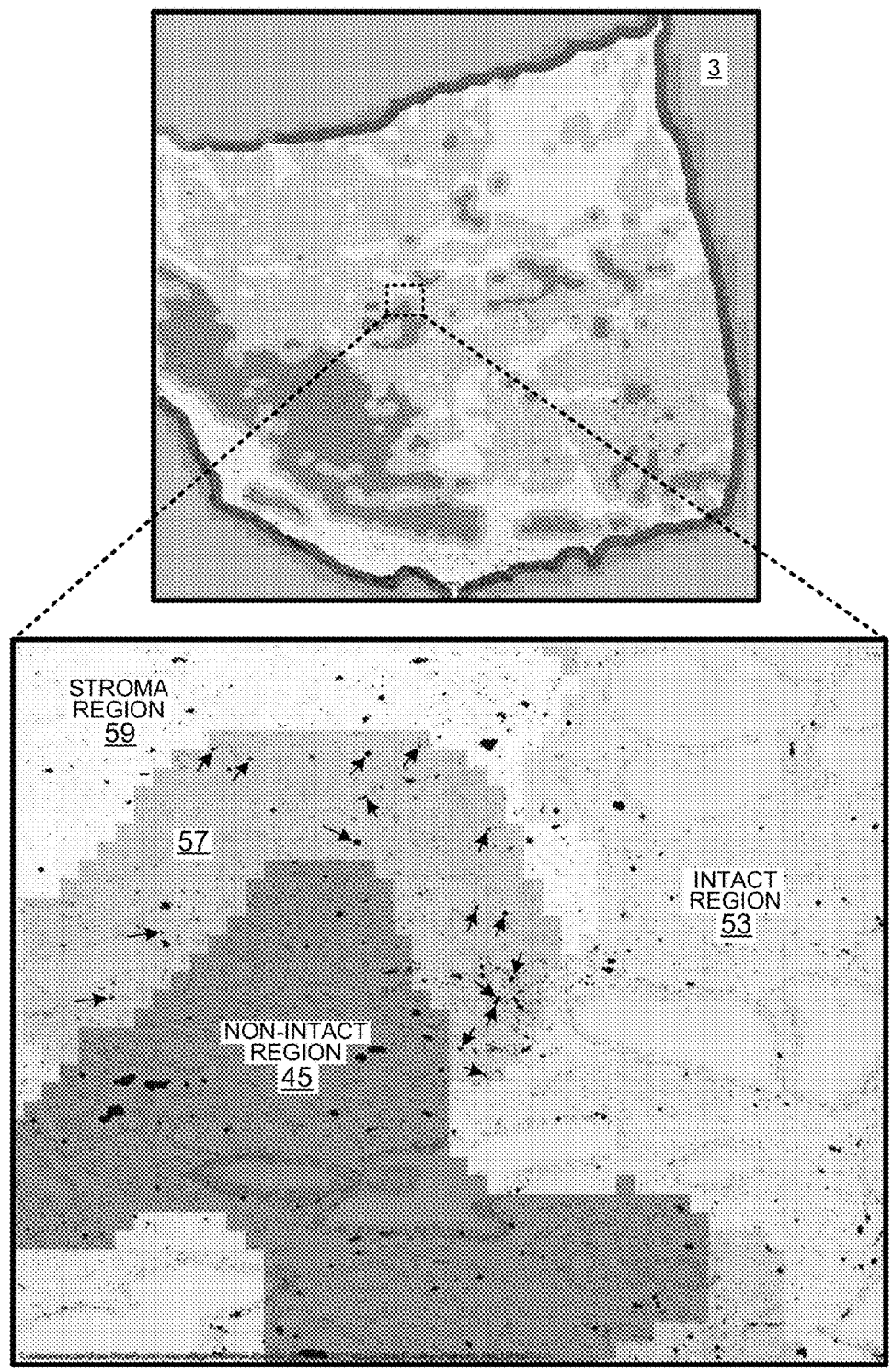
FIG. 19 illustrates how the system analyzes the second digital image and generates M1 macrophage objects.

Next, the system analyzes the information of the second digital image 3 and generates M1 macrophage objects. As described above, the double staining of the second slide results in individual M1 type macrophages being stained so that they appear red. The fine resolution red pixels of the second digital image 3 are identified and analyzed. Those red pixels that are determined to have a fifth predetermined spatial relationship with respect to one another are deemed to correspond to an individual M1 macrophage object. Each individual M1 macrophage object corresponds to one and only one M1 macrophage in the tissue sample. In FIG. 19, M1 macrophage objects in the influence zone 57 are identified by arrowheads. There are M1 macrophage objects in other regions of FIG. 19, but those M1 macrophages are not marked with arrows.

Figure 20:
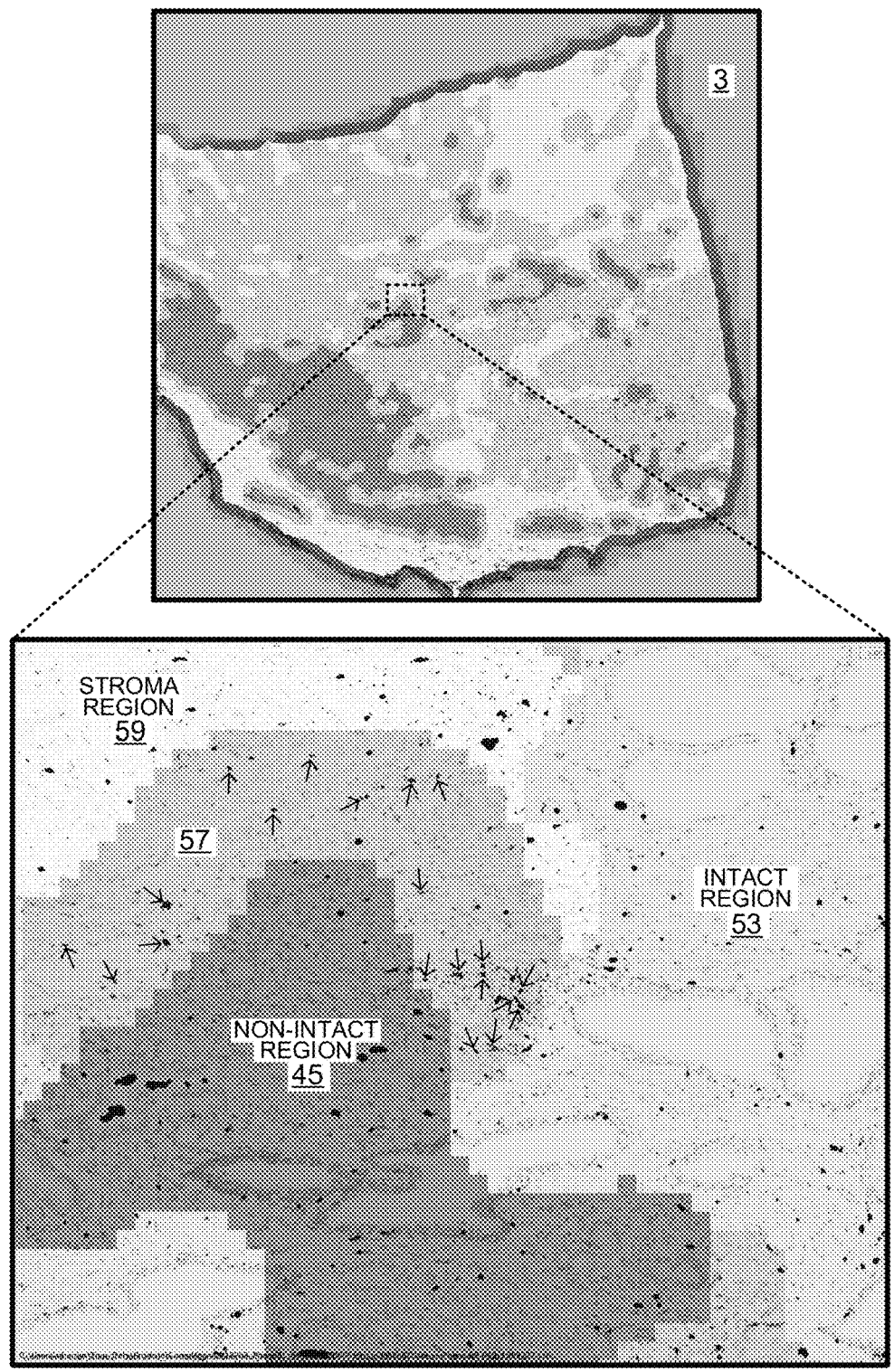
FIG. 20 illustrates how the system analyzes the second digital image and generates M2 macrophage objects.

Next, the system analyzes the information of the second digital image 3 and generates M2 macrophage objects. As described above, the double staining of the second slide results in individual M2 type macrophages being stained so that they appear brown. The fine resolution brown pixels of the second digital image are identified and analyzed. Those brown pixels that are determined to have a sixth predetermined spatial relationship with respect to one another are deemed to correspond to an individual M2 macrophage object. Each individual M2 macrophage object corresponds to one and only one M2 macrophage in the tissue sample. In FIG. 20, M2 macrophage objects in the influence zone 57 are identified by arrowheads. There are M2 macrophage objects in other regions of FIG. 20, but those M2 macrophages are not marked with arrows.

In the actual digital image, the M2 macrophages are identified by virtue of their being stained to appear brown, whereas the M1 type macrophages are identified by virtue of their being stained to appear red. These color distinctions that are used by system 1 cannot be shown in the grayscale diagrams of FIGS. 19-20, so the M1 type macrophages are identified in FIG. 19 by closed-head arrow heads, and the M2 type macrophages are identified in FIG. 20 by open-head arrow heads.

Next, the system determines the score 10 based at least in part on a count of macrophages in one or more influence zones. In one particular example, the system applies the decision tree and logic flow 100 shown in the flowchart of FIG. 21 to determine the score 10.

Figure 22:
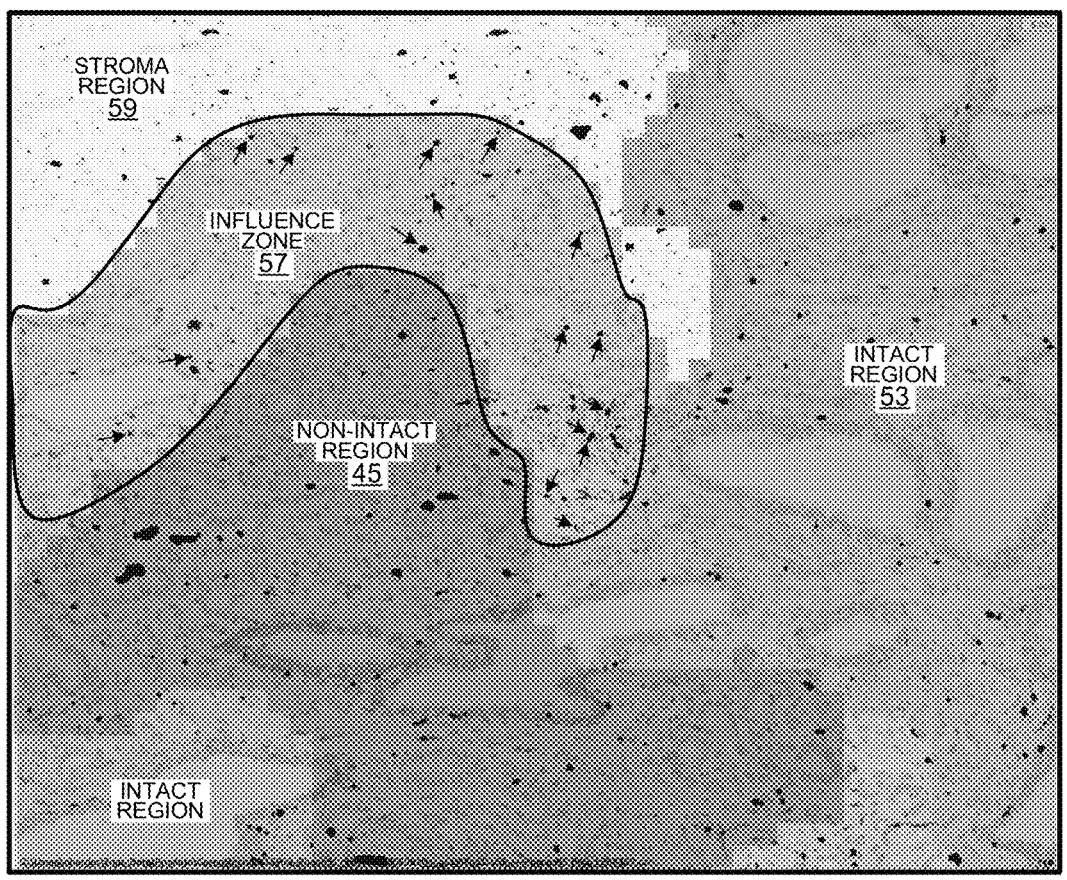
FIG. 22 illustrates how the system counts M1 type macrophage objects that correspond to M1 type macrophages disposed in influence zones.

The system determines (step 101) a value V1. The system does this by counting all the M1 macrophage objects that correspond to pixels in any influence zone. This is an aggregated count across all the influence zones of the entire second digital image 3. In one particular example, this aggregated M1 macrophage count is normalized by dividing the aggregated M1 count by the aggregated area (in square pixels) of all the non-intact regions zones in the second digital image. This normalized count of M1 macrophages in all influence zones is the value V1. FIG. 22 illustrates the counting of M1 macrophage objects of one influence zone. The M1 macrophages are identified with arrows.

Figure 23:
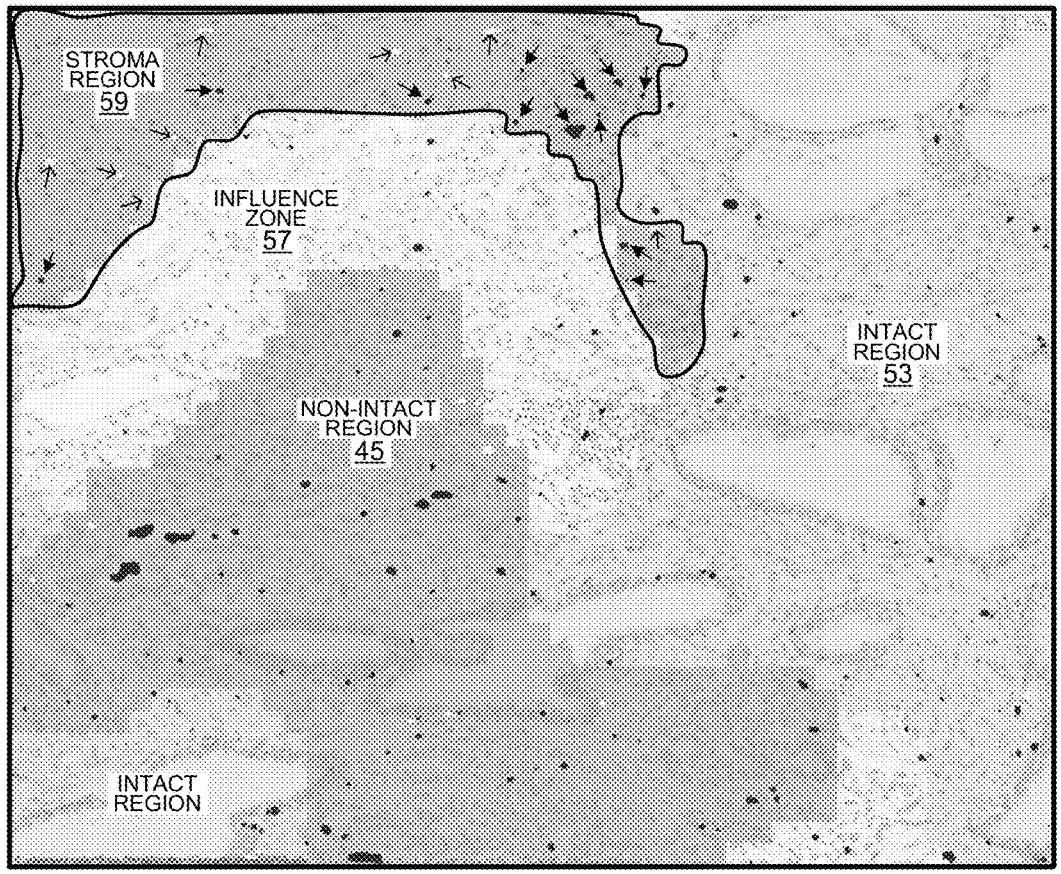
FIG. 23 illustrates how the system counts M1 type macrophage objects that correspond to M1 type macrophages disposed in stroma regions, and how the system counts M2 type macrophage objects that correspond to M2 type macrophages disposed in stroma regions.

The system determines (step 102) a value V2. The system does this by generating a first count equal to the sum of: 1) all M1 macrophage objects that correspond to pixels in any stroma regions, and 2) all M1 macrophage objects that correspond to pixels in any influence zone. This first count is an aggregated count across all the stroma regions of the entire second digital image. In addition, the system generates a second count equal to the sum of: 1) all M2 macrophage objects that correspond to pixels in any stroma region, and 2) all M2 macrophage objects that correspond to pixels in any influence zone. This second count is also an aggregated count across all the stroma regions of the entire second digital image 3. The value V2 is the ratio of the first count (the number of M1 macrophages in stroma regions and influence zones) to the second count (the number of M2 macrophages in stroma regions and influence zones). FIG. 23 illustrates the counting of M1 macrophage objects in a part of a stroma region, and the counting of M2 macrophages in the same part of the same stroma region. The M1 macrophages are denoted with filled arrowheads. The M2 macrophages are denoted with open arrowheads. In addition, the first count includes the number of M1 macrophages in the influence zones. FIG. 19 shows M1 type macrophages in an influence zone. In addition, the second count includes the number of M2 macrophages in the influence zones. FIG. 20 shows M2 type macrophages in an influence zone.

Figure 24:
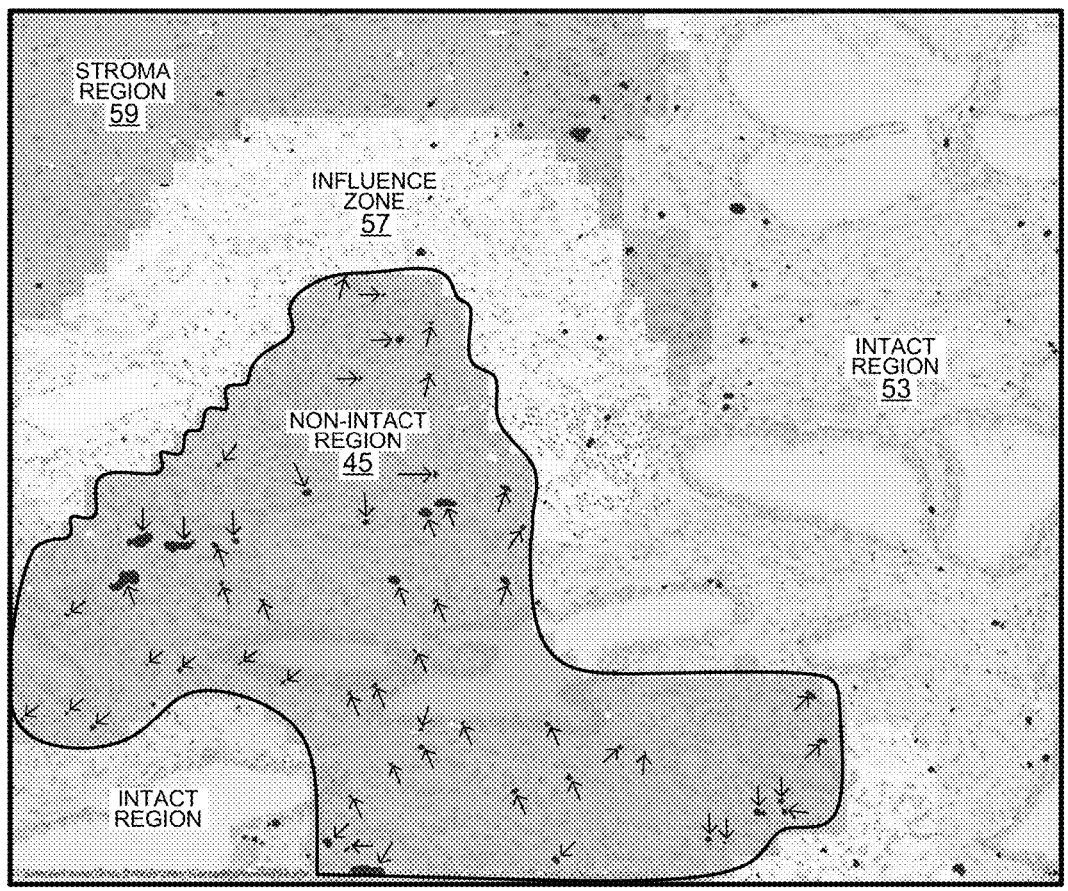
FIG. 24 illustrates how the system counts M2 type macrophage objects that correspond to M2 type macrophages disposed in non-intact regions.

The system 1 determines (step 103) a value V3. The system does this by generating a count of all M2 macrophages in non-intact regions. This is an aggregated count across all the non-intact regions of the entire second digital image 3. The system also determines the total area (in square pixels) of the non-intact regions in the second digital image. The value V3 is the density of M2 macrophages in the non-intact regions. In one example, the density is the number of M2 macrophages in all the non-intact regions divided by the total area of all the non-intact regions. FIG. 24 shows the counting of M2 macrophage objects in a part of a non-intact region. The M2 macrophages are denoted with open arrowheads.

Figure 21:
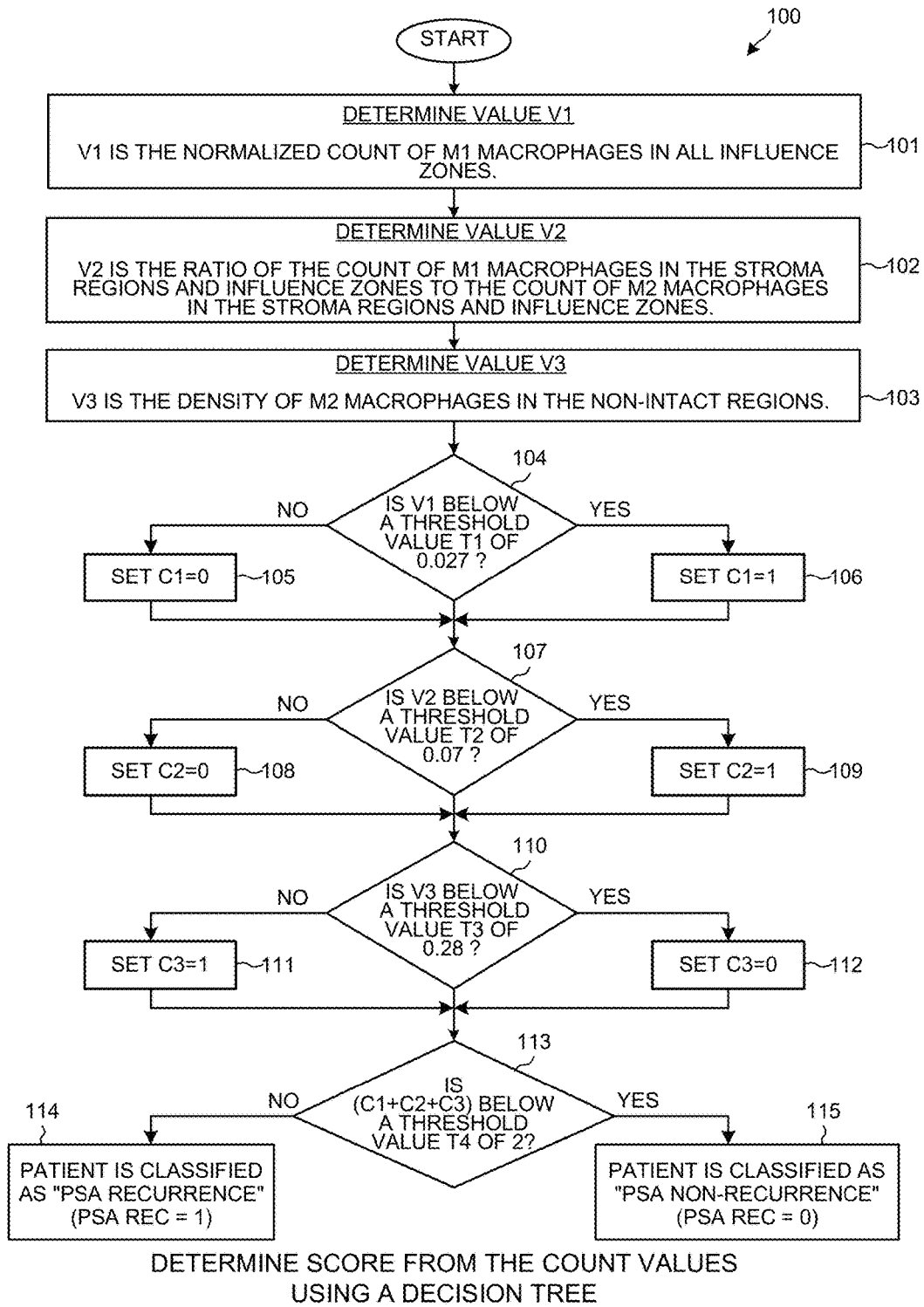
FIG. 21 is a flowchart of a method carried out by the system, where the result of the method is a score.

As set forth in the flowchart of FIG. 21, if the value V1 is below (step 104) a threshold value T1 of 0.027, then a value C1 is set (step 105) to 1, otherwise the value C1 is set (step 106) to 0. If the value V2 is below (step 107) a threshold value T2 of 0.07, then a value C2 is set (step 108) to 1, otherwise the value C2 is set (step 109) to 0. If the value V3 is below (step 110) a threshold value T3 of 0.28, then a value C3 is set (step 111) to 0, otherwise the value C3 is set (step 112) to 1. The system 1 then determines (step 113) if the quantity (C1+C2+C3) is below a threshold value T4 of 2. If it is, then the score 10 is an indication (step 113) that the patient is classified as "PSA Non-Recurrence", otherwise the score 10 is an indication (step 114) that the patient is classified as "PSA Recurrence". The threshold values T1, T2, T3 and T4 are determined empirically by comparing the system-determined scores of a large population of prostate cancer patients with known PSA recurrence data for that same large population of prostate cancer patients. The values T1, T2, T3 and T4 are set, and the resulting score is determined for each patient of the population. The accuracy of the resulting scores is determined using the known PSA recurrent data of the population. The values T1, T2, T3 and T4 are then adjusted, and the process is repeated. The particular combination of T1, T2, T3 and T4 values that results in the best correlation between the score as output by the system and known PSA recurrence data across each of the many patients of the large population is then chosen to be the combination of values used by the system.

The system then displays the score 10 on the display 12 of the computer 11. FIG. 25 is a screenshot of the display 12. A table 60 of results is displayed. Each row of table 60 is for one tissue sample. The ID# entry in the first column is an identification number that identifies the tissue sample of the row. The row of ID#30 is for the analysis of the tissue sample 4 of FIG. 1. The V1 entry in the second column is the V1 value as determined in step 101 of the method of FIG. 21. For the row of ID#30, the count of M1 macrophages in all influence zones was 561. The V2 entry in the third column is the V2 value as determined in step 102 of the method 100 of FIG. 21. For the row of ID#30, the count of M1 macrophages in the stroma regions and in the influence zones was 5,660. For the row of ID#30, the count of M2 macrophages in all stroma regions and in all influence zones was 62,100. The V3 entry in the fourth column is the V3 value as determined in step 103 of the method of FIG. 21. For the row of ID#30, the count of M2 macrophages in all non-intact regions was 3,339. The C1 entry in the fifth column is the C1 value as determined in steps 104-106 of the method of FIG. 21. The C2 entry in the sixth column is the C2 value as determined in steps 107-109 of the method of FIG. 21. The C3 entry in the seventh column is the C3 value as determined in steps 110-112 of the method of FIG. 21. The PSA recurrence value in the PSA REC column is the score 10 as determined in steps 113-115 of the method 100 of FIG. 21. A PSA REC score value of "1" indicates that the patient is predicted to experience PSA recurrence. A PSA REC score value of "0" indicates that the patient is predicted not to experience PSA recurrence.

FIG. 26 is a diagram of a confusion matrix for the system 1 of FIG. 1. The system 1 analyzed digital images of tissue samples for 51 patients. As indicated by the rightmost column of the matrix, the scores output by the system indicated that 13 of the patients had a score of "PSA non-recurrence", and that 38 of the patients had a score of "PSA recurrence". Of the 13 patients scored by the system to be "PSA non-recurrence", this was the correct result in 11 of the cases as indicated by known PSA recurrence information on the patients, and this was the incorrect result in 2 of the cases as indicated by known PSA recurrence information on the patients. Of the 38 patients that the system scored as "PSA recurrence", this was the correct result in 29 of the cases as indicated by known PSA recurrence information on the patients, and was the incorrect result in 9 of the cases as indicated by known PSA recurrence information on the patients. In total, 40 out of 51 patients were scored correctly. Accordingly, the system performed with an overall accuracy of 78.4 percent. This means that 78.4 percent of the patients were correctly scored by the system.

Figure 27:
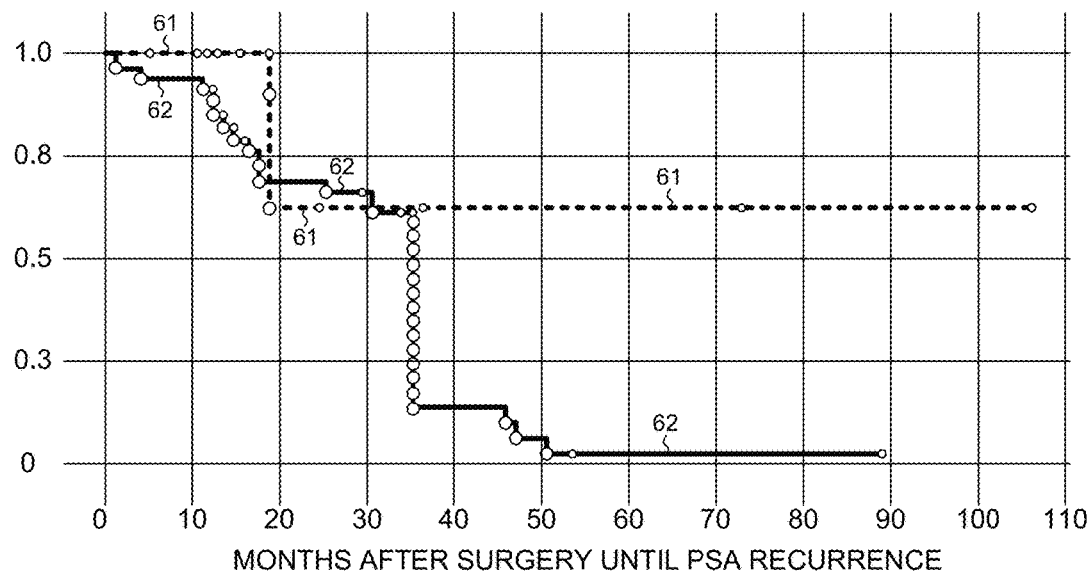
FIG. 27 is a Kaplan-Meier plot for using the system of FIG. 1 to predict PSA recurrence.

FIG. 27 is a Kaplan-Meier plot that illustrates the classification accuracy of the system 1 of FIG. 1 in predicting PSA recurrence. The Kaplan-Meier plot shows the probability of PSA non-recurrence on the y-axis and shows the disease-free survival time on the x-axis. The dashed line 61 represents the group of patients predicted by the system 1 of FIG. 1 to be "PSA non-recurrence". The solid line 62 represents the group of patients predicted by the system 1 of FIG. 1 to be "PSA recurrence". An optimal classification would result in a Kaplan-Meier plot where the dashed line 61 is a straight horizontal line at a y-value of 1.0 for patients predicted to be "PSA non-recurrence", and a decreasing solid line 62 representing the patients predicted by the system to be "PSA recurrence". On one line, each circle symbol represents one patient. A small circle symbol represents the end of an observation period, so the small circle symbols are shown on horizontal straight lines in the plot. Each step down in a line represents one patient experiencing PSA recurrence at the time point given on the x-axis. A larger circle symbol represents an occurrence of the event ("PSA recurrence"), so the larger circle symbols are shown on vertical step-down sections. Ideally, all the patients predicted by the system to be "PSA non-recurrence" would never experience PSA recurrence. Therefore, the upper dashed line 61 that represents these patients would never descend. In the actual plot of FIG. 27, however, the line 61 makes a step down. This step down corresponds to the two false negatives represented by the "2" in the upper row of the confusion matrix of FIG. 26. Ideally, at the right side of the plot of FIG. 27 at 110 months, the two lines 61 and 62 would be separated in the vertical dimension to the maximal degree. However, in the actual plot of FIG. 27, due to the step down of line 61, the vertical separation between the two lines 61 and 62 is somewhat smaller than it otherwise would be.

Figure 28:
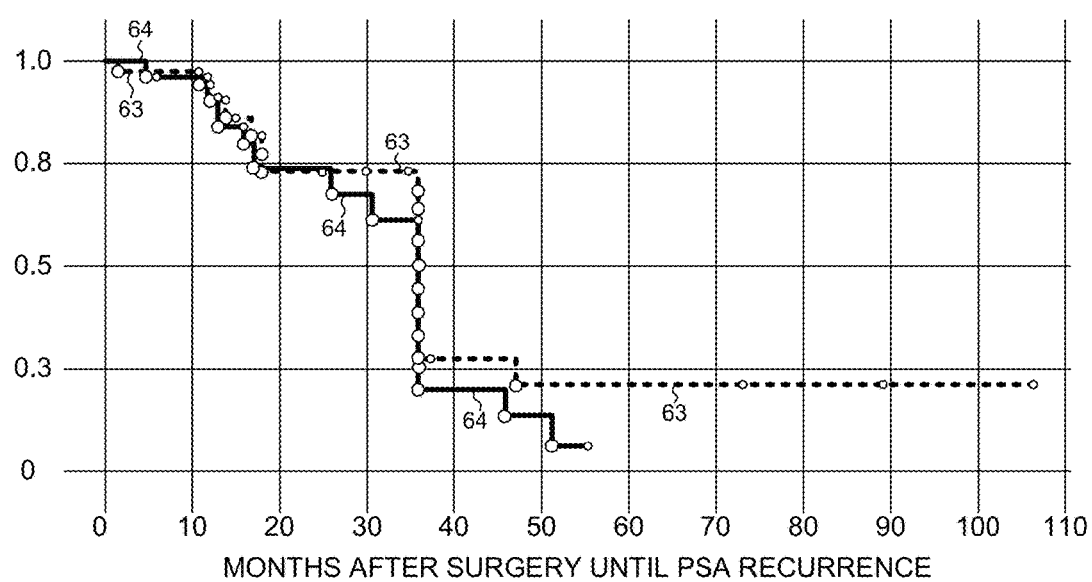
FIG. 28 is a Kaplan-Meier plot for using Gleason scoring to predict PSA recurrence.

FIG. 28 is a Kaplan-Meier plot that illustrates the classification accuracy using Gleason scoring to predict PSA recurrence. For purposes of the plot of FIG. 28, for a Gleason score range of 2 to 10, a Gleason score of 7 or more is considered to be an attempted prediction of "PSA recurrence", and a Gleason score of 6 or less is considered to be an attempted prediction of "PSA non-recurrence". The dashed line 63 represents the group of patients predicted in this way by Gleason scoring to be "PSA non-recurrence". The solid line 64 represents the group of patients predicted in this way by Gleason scoring to be "PSA recurrence".

Comparison of the Kaplan-Meier plots of FIG. 27 and FIG. 28 reveals that the system 1 of FIG. 1 is much better at predicting PSA recurrence that is the accepted gold standard used in a conventional clinical routine, i.e. the Gleason scoring method. In FIG. 27, the lines 61 and 62 are well separated, whereas in FIG. 28 the lines 63 and 64 are not well separated. The system 1 of FIG. 1 is a much better predictor of PSA recurrence than is the Gleason scoring method. In fact, for patients in the Gleason score range of 6 to 7, it is very difficult with the Gleason scoring method to give the patient a PSA recurrence prognosis at all. The system 1 of FIG. 1, on the other hand, does give a PSA recurrence prognosis that is fairly accurate as can be seen from the confusion matrix of FIG. 26.

Although an example of system 1 for predicting PSA recurrence is set forth above that outputs a score that has one of two values (PSA REC=0 or PSA REC=1), in other examples system 1 outputs a numeral score in a predefined numerical range. In one example, the range is from zero to one hundred. A score greater than fifty indicates PSA recurrence is likely, and a score less than fifty indicates that PSA recurrence is not likely. The more the score is above fifty, the more certain the PSA recurrence prediction is. Likewise, the more the score is below fifty, the more certain the non-PSA recurrence prediction is.

Although the present invention has been described in connection with certain specific embodiments for instructional purposes, the present invention is not limited thereto. In one example, a system receives digital image information, uses the digital image information to define influence zones around regions of tumor tissue, and counts macrophages in these influence zones thereby generating one or more counts, and then based at least in part on these one or more counts generates a score, where the score is indicative of a PSA recurrence prognosis. Accordingly, various modifications, adaptations, and combinations of various features of the described embodiments can be practiced without departing from the scope of the invention as set forth in the claims.

What is claimed is:
1. A method comprising:
  generating first objects from a first digital image of a first tissue slice of a cancer patient, wherein the first tissue slice has been stained with a first stain that stains basal epithelial cells and a second stain that stains luminal epithelial cells, and wherein the first objects have been stained with the first stain;
  generating second objects from the first digital image of the first tissue slice, wherein the second objects have been stained with the second stain;
  defining third objects that include only those second objects that have more than a minimum separation from any of the first objects;
  generating a scoring region that includes the third objects;
  generating fourth objects from a second digital image of a second tissue slice of the cancer patient, wherein the second tissue slice has been stained with a third stain that stains tumoricidal M1 macrophages and a fourth stain that stains tumorigenic M2 macrophages, and wherein the fourth objects have been stained with the third stain;

generating fifth objects from the second digital image of the second tissue slice, wherein the fifth objects have been stained with the fourth stain;

co-registering the first digital image with the second digital image and transferring the scoring region to the second digital image;

defining an influence zone around the scoring region on the second digital image;

counting a first number of the fourth objects and a second number of the fifth objects that are located within the influence zone; and determining a score based on the first number and the second number, wherein the score indicates whether the cancer patient will likely have a recurrence of cancer.

2. The method of claim 1, wherein the score indicates that the cancer patient will likely have a recurrence of measurable prostate-specific antigen (PSA) in the cancer patient's blood.

3. The method of claim 1, wherein the minimum separation is 150 microns.

4. The method of claim 1, wherein the defining the third objects involves growing the second objects by the minimum separation and excluding from the third objects those second objects that have grown into any of the first objects.

5. The method of claim 1, wherein the scoring region is generated by growing the third objects in all directions by a growth distance and merging all areas grown into and then shrinking an outer boundary of the scoring region by the growth distance.

6. The method of claim 1, wherein the first stain is transcription factor p63 and the second stain is cytokeratin 18 (CK18).

7. The method of claim 1, wherein the third stain is cluster of differentiation 68 (CD68) and the fourth stain is cluster of differentiation 163 (CD163).

8. A method involving a Prostate-Specific Antigen (PSA) recurrence prediction system, the method comprising:

(a) duplex staining a first sample of glandular tissue from a cancer patient with a first pair of biomarker stains thereby obtaining a first stained tissue sample;

(b) using a digital camera to generate a first digital image from the first stained tissue sample;

(c) duplex staining a second sample of glandular tissue from the prostate cancer patient with a second pair of biomarker stains thereby obtaining a second stained tissue sample;

(d) generating a second digital image from the second stained tissue sample;

(e) generating first objects from the first digital image, wherein each first object corresponds to a non-intact gland in the glandular tissue of the patient;

(f) defining a non-intact region mask from the first objects;

(g) generating second objects from the first digital image, wherein each second object corresponds to an intact gland in the glandular tissue of the patient;

(h) defining an intact region mask from the second objects;

(i) applying the non-intact region mask and the intact region mask to the second digital image and thereby defining non-intact regions of the second digital image and intact regions of the second digital image;

(j) defining stroma regions of the second digital image;

(k) defining influence zones in the second digital image, wherein each influence zone is disposed on a border of a non-intact region;

(l) generating third objects from the second digital image, wherein each third object corresponds to an M1 macrophage, wherein some of the third objects correspond to M1 macrophages disposed in influence zones;

(m) generating fourth objects from the second digital image, wherein each fourth object corresponds to an M2 macrophage, wherein some of the fourth objects correspond to M2 macrophages disposed in influence zones;

(n) counting the third objects that correspond to M1 macrophages disposed in influence zones and thereby obtaining a first number;

(o) counting the fourth objects that correspond to M2 macrophages disposed in influence zones and thereby obtaining a second number;

(p) determining a score based at least in part on the first number and the second number, wherein the score is indicative of whether the cancer patient will likely have a recurrence of cancer; and (q) displaying the score on a display device of the PSA recurrence prediction system, wherein (e) through (q) are performed by the PSA recurrence prediction system.

9. A method involving a Prostate-Specific Antigen (PSA) recurrence prediction system, the method comprising:

(a) generating first objects from a first digital image of a first tissue slice of a sample from a cancer patient, wherein the first tissue slice has been stained with a first stain that stains basal epithelial cells and a second stain that stains luminal epithelial cells, and wherein each first object corresponds to a part of the tissue that has been stained with the first stain;

(b) generating second objects from the first digital image of the first tissue slice, wherein each second object corresponds to a part of the tissue that has been stained with the second stain;

(c) based at least in part on the first and second objects defining a non-intact region mask, wherein the non-intact region mask defines a plurality of non-intact regions, wherein each non-intact region corresponds to an amount of the tissue of the first tissue slice that includes non-intact prostate glands;

(d) using the non-intact region mask to define an influence zone mask, wherein the influence zone mask defines a plurality of influence zones, wherein each influence zone corresponds to an amount of tissue of the first tissue slice that is disposed along an outer boundary of the tissue corresponding to a non-intact region;

(e) applying the influence zone mask to a second digital image and thereby defining an influence zone in the second digital image, wherein the second digital image is of a second tissue slice of the sample from the cancer patient, wherein the second tissue slice has been stained with a third stain that stains macrophages;

(f) generating third objects from the second digital image, wherein each third object corresponds to a macrophage in the second tissue slice that has been stained with the third stain;

(g) counting third objects that correspond to macrophages disposed in the influence zone defined in (e) thereby obtaining a number;

(h) determining a score based at least in part on the number, wherein the score is indicative of whether the cancer patient will likely have a recurrence of cancer; and (i) displaying the score on a display device of the PSA recurrence prediction system, wherein (a) through (i) are performed by the PSA recurrence prediction system.

10. The method of claim 9, further comprising:

(j) generating fourth objects from the second digital image, wherein each fourth object corresponds to an M2 macrophage in the second tissue slice that has been stained with a fourth stain, wherein each third object corresponds to an M1 macrophage in the second tissue slice that has been stained with the third stain; and (k) counting fourth objects that correspond to M2 macrophages disposed in the influence zone defined in (e) thereby obtaining a second number, wherein the number obtained in (g) from the counting of third objects is a first number, wherein the score determined in (h) is based at least in part on both the first number and the second number, and wherein (j) and (k) are also performed by the PSA recurrence prediction system.

11. The method of claim 10, wherein the first number is a count of M1 macrophages disposed in multiple influence zones, and wherein the second number is a count of M2 macrophages disposed in multiple influence zones.

12. The method of claim 10, wherein the first number is a count of M1 macrophages disposed in a single influence zone, and wherein the second number is a count of M2 macrophages disposed in the single influence zone.

13. The method of claim 9, further comprising:

(j) based at least in part on the first and second objects defining an intact region mask, wherein the intact region mask defines a plurality of intact regions, wherein each intact region corresponds to an amount of the tissue of the first tissue slice that includes intact prostate glands and contains substantially no non-intact prostate glands, and wherein the intact region mask is used along with the non-intact region mask in the defining in (d) of the influence zone mask.

14. The method of claim 13, further comprising:

(k) defining a stroma region mask, and wherein the stroma region mask is used along with the intact region mask and the non-intact region mask in the defining in (d) of the influence zone mask.

15. The method of claim 9, wherein the determining of the score in (h) involves applying a decision tree, wherein a decision taken in traversing the decision tree depends upon a value, and wherein the value is based at least in part on the number obtained in (g).

16. A method comprising:

(a) generating first objects from a first digital image of a first tissue slice from a prostate cancer patient, wherein the first tissue slice has been stained with a first stain that stains basal epithelial cells and a second stain that stains luminal epithelial cells, and wherein each first object corresponds to a part of the tissue that has been stained with the first stain;

(b) generating second objects from the first digital image of the first tissue slice, wherein each second object corresponds to a part of the tissue that has been stained with the second stain;

(c) defining a non-intact region mask surrounding a plurality of non-intact regions based on the first and second objects, wherein each non-intact region corresponds to an amount of the first tissue slice that includes non-intact prostate glands;

(d) using the non-intact region mask to define an influence zone mask surrounding a plurality of influence zones, wherein each influence zone corresponds to an amount of the first tissue slice that is disposed along an outer boundary of one of the non-intact regions;

(e) applying the influence zone mask to a second digital image and thereby defining an influence zone in the second digital image, wherein the second digital image is of a second tissue slice from the prostate cancer patient, wherein the second tissue slice has been stained with a third stain that stains macrophages;

(f) generating third objects from the second digital image, wherein each third object corresponds to a macrophage in the second tissue slice that has been stained with the third stain;

(g) counting a number of third objects that correspond to macrophages disposed in the influence zone defined in (e); and (h) determining a score based on the number, wherein the score is indicative of whether the prostate cancer patient will likely have a recurrence of cancer.

17. The method of claim 16, further comprising:

(i) defining an intact region mask surrounding a plurality of intact regions based on the first and second objects, wherein each intact region corresponds to an amount of the first tissue slice that includes intact prostate glands and contains substantially no non-intact prostate glands, and wherein the intact region mask is used along with the non-intact region mask in the defining in (d) of the influence zone mask.

18. The method of claim 16, wherein the determining of the score in (h) involves applying a decision tree, wherein a decision taken in traversing the decision tree depends upon a value, and wherein the value is based on the number obtained in (g).

* * * * *